US012265317B2

(12) United States Patent
Tonokawa et al.

(10) Patent No.: US 12,265,317 B2
(45) Date of Patent: *Apr. 1, 2025

(54) MULTI-SUPPORT ACCESSORY WITH INTEGRATED POWER SUPPLY FOR IMAGE CAPTURE DEVICES

(71) Applicant: GoPro, Inc., San Mateo, CA (US)

(72) Inventors: Matthew Masao Tonokawa, Kailua, HI (US); Alexis De Stasio, San Francisco, CA (US); Jesse Frost Patterson, Pacifica, CA (US); Matthew David Thomas, Castro Valley, CA (US); Huy Phuong Nguyen, Alpine, UT (US)

(73) Assignee: GoPro, Inc., San Mateo, CA (US)

( * ) Notice: Subject to any disclaimer, the term of this patent is extended or adjusted under 35 U.S.C. 154(b) by 100 days.

This patent is subject to a terminal disclaimer.

(21) Appl. No.: 17/991,883

(22) Filed: Nov. 22, 2022

(65) Prior Publication Data

US 2023/0152674 A1 May 18, 2023

Related U.S. Application Data

(63) Continuation of application No. 17/985,451, filed on Nov. 11, 2022.
(Continued)

(51) Int. Cl.
*G03B 17/56* (2021.01)
*F16M 11/12* (2006.01)
(Continued)

(52) U.S. Cl.
CPC ......... *G03B 17/561* (2013.01); *F16M 11/126* (2013.01); *F16M 11/38* (2013.01); *F16M 13/04* (2013.01); *F16M 13/06* (2013.01)

(58) Field of Classification Search
None
See application file for complete search history.

(56) References Cited

U.S. PATENT DOCUMENTS

| 1,138,417 | A | * | 5/1915 | Rottenburg | ............... | A45B 3/00 |
| | | | | | | 248/187.1 |
| 6,301,447 | B1 | | 10/2001 | Jackson | | |

(Continued)

FOREIGN PATENT DOCUMENTS

| CN | 111981288 A | | 11/2020 |
| CN | 215378999 U | * | 12/2021 |

OTHER PUBLICATIONS

International Search Report and Written Opinion issued in App. No. PCT/US2022/049694, mailing date Apr. 7, 2023, 11 pages.

*Primary Examiner* — Rodney E Fuller
(74) *Attorney, Agent, or Firm* — Young Basile Hanlon & MacFarlane, P.C.

(57) ABSTRACT

An accessory for an image capture device is disclosed that includes: a body; a rotatable first support that is configured for connection to the image capture device; a second support that is pivotably reconfigurable between stowed and deployed configurations; and a third support including first and second legs that are pivotably connected to the body such that the third support is reconfigurable between collapsed and expanded configurations. In the stowed configuration, the second support is concealed within the body, and in the deployed configuration, the second support extends outwardly from the body to facilitate connection of the accessory to an ancillary product. In the collapsed configuration, the third support defines a grip for the image capture device, and in the expanded configuration, the body defines a third leg that cooperates with the first and second legs to provide a freestanding base for the image capture device.

20 Claims, 19 Drawing Sheets

Related U.S. Application Data

(60) Provisional application No. 63/279,553, filed on Nov. 15, 2021.

(51) Int. Cl.
*F16M 11/38* (2006.01)
*F16M 13/04* (2006.01)
*F16M 13/06* (2006.01)

(56) References Cited

U.S. PATENT DOCUMENTS

| | | | |
|---|---|---|---|
| 9,360,742 B1* | 6/2016 | Harrison | G03B 17/08 |
| D822,092 S | 7/2018 | Bergman | |
| D852,874 S | 7/2019 | Bergman | |
| RE49,005 E | 4/2022 | Bergman | |
| 2014/0191094 A1* | 7/2014 | Esarey | F16M 11/242 |
| | | | 29/525.01 |
| 2015/0323855 A1* | 11/2015 | Overall | G03B 17/566 |
| | | | 396/419 |
| 2016/0218547 A1 | 7/2016 | Corley | |
| 2021/0109425 A1 | 4/2021 | Robb | |
| 2021/0173288 A1 | 6/2021 | Vitale | |
| 2021/0314431 A1 | 10/2021 | Goldburt | |
| 2022/0235898 A1* | 7/2022 | Wang | F16M 11/121 |

* cited by examiner

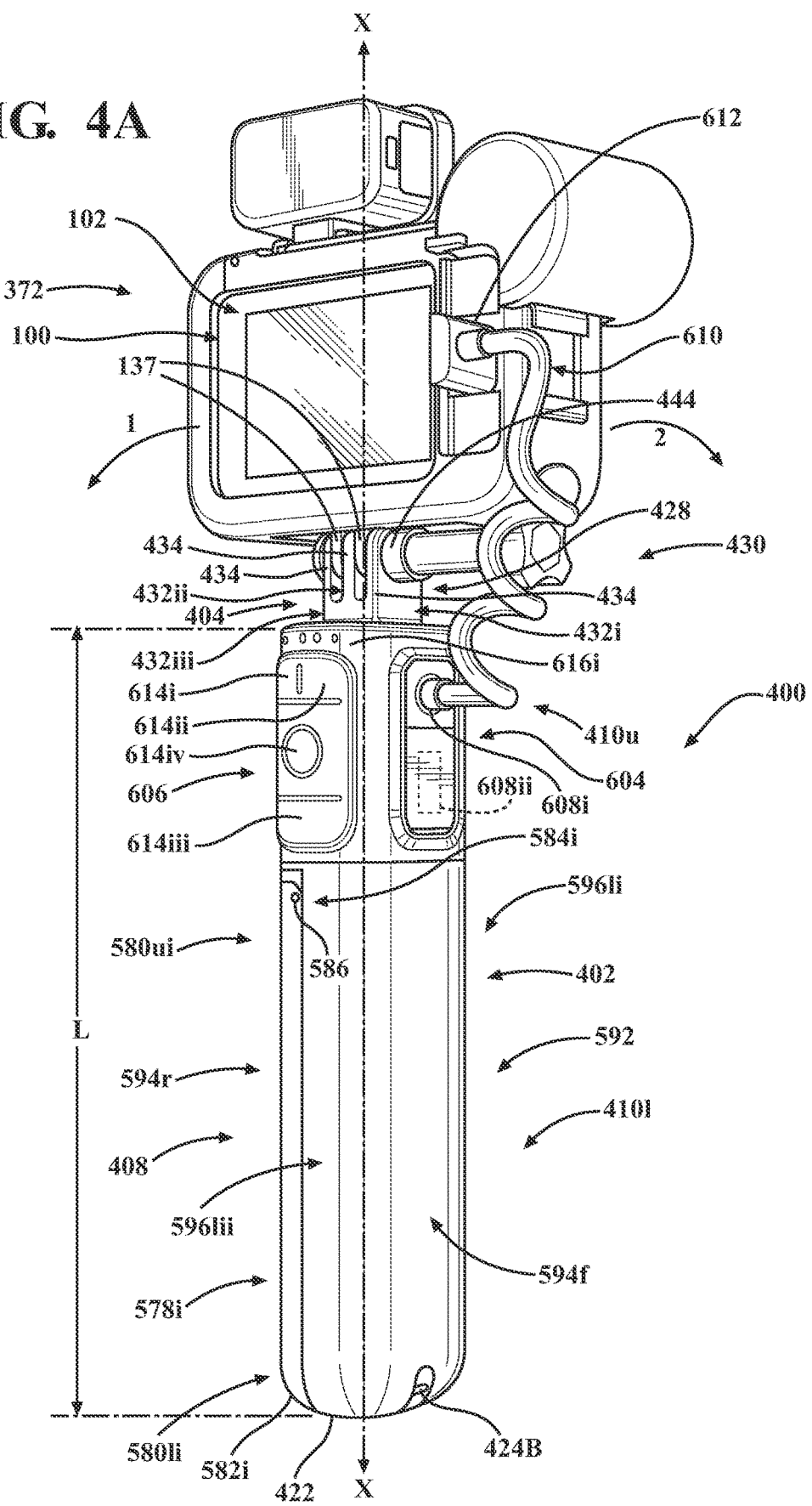

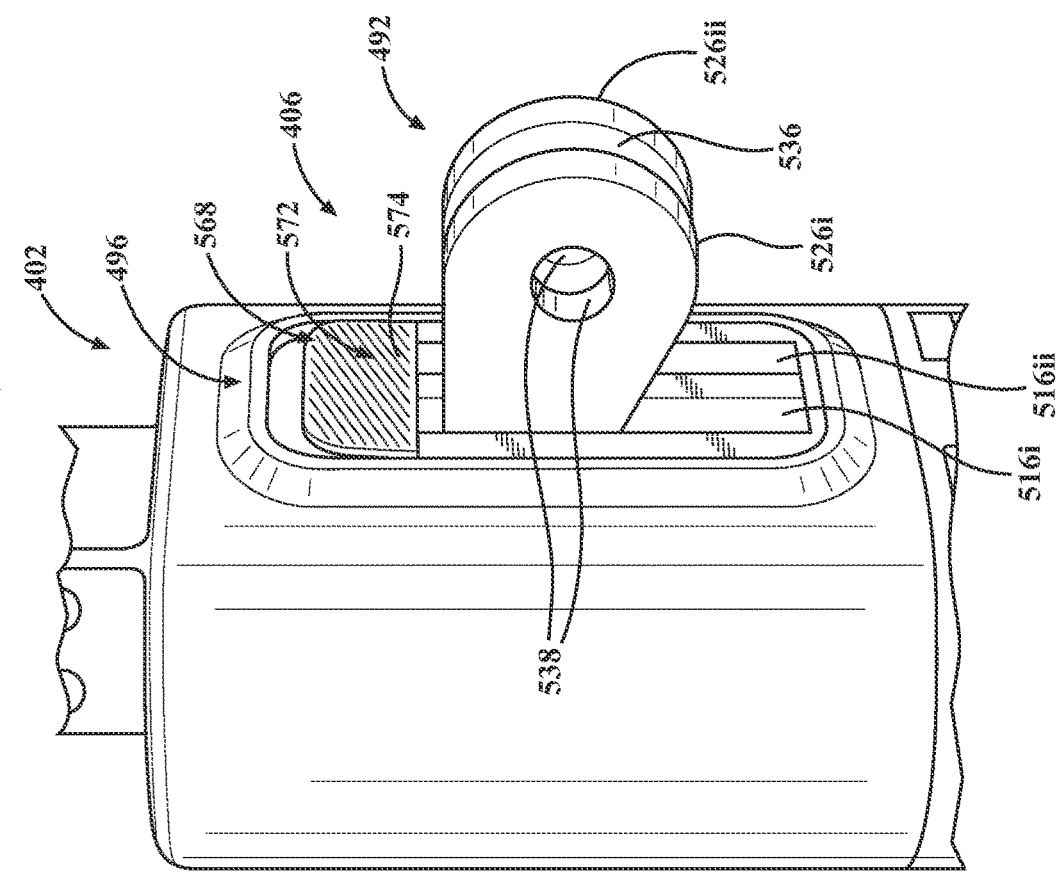
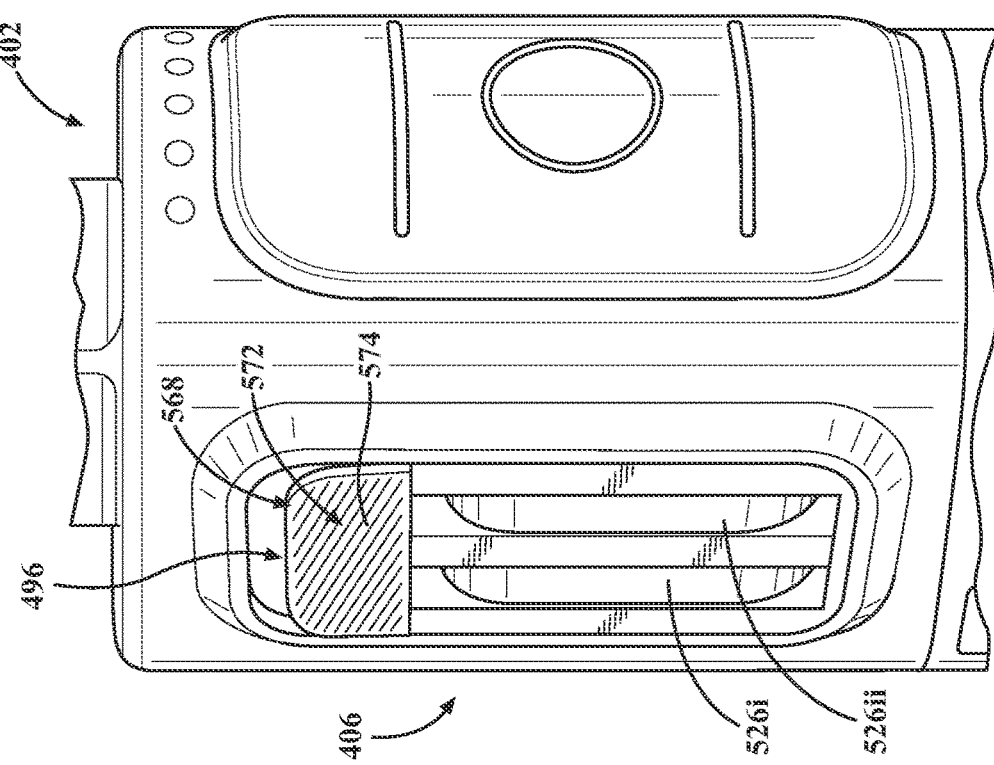

MULTI-SUPPORT ACCESSORY WITH INTEGRATED POWER SUPPLY FOR IMAGE CAPTURE DEVICES

CROSS-REFERENCE TO RELATED APPLICATION(S)

This application is a continuation of U.S. patent application Ser. No. 17/985,451, filed on Nov. 11, 2022, which claims the benefit of and priority to U.S. Provisional Patent Application Ser. No. 63/279,553, filed on Nov. 15, 2021, the entire contents of which are hereby incorporated by reference.

TECHNICAL FIELD

The present disclosure relates to image capture devices (e.g., cameras, video recorders, cell phones, etc.) and corresponding accessories for use therewith. More specifically, the present disclosure relates to an accessory for an image capture device that includes an integrated power supply (e.g., a battery) and (a set, series, plurality of) supports that facilitate connection of the image capture device to the accessory and utilization of the image capture device and the accessory across a variety of use cases.

BACKGROUND

While a variety of extended power solutions have been developed in an effort to extend the battery life of image capture devices, the known solutions often function exclusively in a hand-held manner and can be cumbersome to use in that they typically require two-handed operation of the image capture device.

The present disclosure addresses these deficiencies, among others, and provides an extended power solution with a clean, integrated design that not only allows for single-handed and wireless operation of the image capture device, but facilitates connection to ancillary products (accessories) and functions as a freestanding base for the image capture device.

SUMMARY

In one aspect of the present disclosure, an accessory for an image capture device is disclosed that includes: a body defining a longitudinal axis; a first support that is located at an upper end of the body; a second support that is pivotable in relation to the body; and a third support that is located at a lower end of the body. The first support is configured for connection to the image capture device and for rotation about a first axis that extends in parallel relation to the longitudinal axis. The second support is pivotable about a second axis that extends in transverse relation to the first axis such that the second support is reconfigurable between a stowed configuration and a deployed configuration. The third support is reconfigurable between a collapsed configuration and an expanded configuration and includes a first leg and a second leg. The first leg is pivotable in relation to the body about a third axis that extends in transverse relation to the first axis and the second axis, and the second leg is pivotable in relation to the body about a fourth axis that extends in transverse relation to the first axis and the second axis. When the third support is in the collapsed configuration, the first leg and the second leg are positioned generally adjacent to the body to define a grip for the image capture device, and when the third support is in the expanded configuration, the first leg and the second leg are spaced from the body such that the lower end of the body defines a third leg that cooperates with the first leg and the second leg to provide a freestanding base for the image capture device.

In certain embodiments, the second support, the first leg, and the second leg may be oriented along a common surface of the body.

In certain embodiments, the accessory may further comprise an electrical interface that is located on an opposite surface of the body as the second support.

In certain embodiments, the accessory may further comprise a control panel that supports operation of the image capture device.

In certain embodiments, the control panel may be located between the second support and the electrical interface.

In certain embodiments, when the second support is in the stowed configuration and the third support is in the collapsed configuration, the body may define a first pair of opposing surfaces and a second pair of opposing surfaces that connect the first pair of opposing surfaces.

In certain embodiments, the first pair of opposing surfaces may each include a generally planar configuration and the second pair of opposing surfaces may each include an arcuate configuration.

In certain embodiments, the first support may include first protrusions and the second support may include second protrusions.

In certain embodiments, the second protrusions may be oriented in generally orthogonal relation to the first protrusions when the second support is in the deployed configuration.

In certain embodiments, the second protrusions may be concealed within the body when the second support is in the stowed configuration.

In certain embodiments, the second support may be configured for connection to a corresponding mounting structure on an ancillary product in the deployed configuration.

In certain embodiments, the third support may be configured such that the third axis intersects the fourth axis.

In certain embodiments, the accessory may further include a power supply that is located within the third leg defined by the lower end of the body.

In another aspect of the present disclosure, an accessory for an image capture device is disclosed that includes: a body defining first recesses; indexing members that are located within the first recesses; a support that is located at an upper end of the body and which includes protrusions configured for connection to the image capture device; and a biasing member. The support is rotatable about an axis of rotation that extends through the body and includes second recesses that are configured to receive the indexing members. The biasing member is located between the body and the support and is configured to bias the support towards the body in an axial direction along the axis of rotation.

In certain embodiments, the support may be configured for rotation through an unlimited range of motion.

In certain embodiments, the body and the support may define a gap therebetween that allows for axial movement of the support in relation to the body during rotation of the support.

In certain embodiments, the first recesses, the second recesses, and the indexing members may correspond in number to thereby define discrete rotational positions for the support.

In certain embodiments, sequential rotational positions may be separated by approximately 90 degrees.

In another aspect of the present disclosure, an accessory for an image capture device is disclosed that includes a body and a support that is pivotable in relation to the body. The body defines a longitudinal axis and includes an integrated power supply that is configured to communicate electrical energy to the image capture device. The support is pivotable in relation to the body about a pivot axis that extends transversely in relation to the longitudinal axis such that the support is reconfigurable between a stowed configuration and a deployed configuration. In the stowed configuration, the support is concealed within the body, and in the deployed configuration, the support extends outwardly from the body to facilitate connection of the accessory to a corresponding mounting structure on an ancillary product.

In certain embodiments, the accessory may further comprise a first biasing member that engages the support to bias the support towards the deployed configuration.

In certain embodiments, the accessory may further comprise a locking mechanism that is movable between a locked position and an unlocked position. In the locked position, the locking mechanism engages the support to maintain the support in the stowed configuration or the deployed configuration, and in the unlocked position, the support is movable between the stowed configuration and the deployed configuration.

In certain embodiments, the accessory may further comprise a second biasing member that is in engagement with the locking mechanism to bias the locking mechanism towards the locked position.

In certain embodiments, the support may include a first locking detent that is configured for engagement with the locking mechanism in the stowed configuration and a second locking detent that is configured for engagement with the locking mechanism in the deployed configuration.

In another aspect of the present disclosure, an accessory is disclosed for an image capture device. The accessory includes: a body defining a longitudinal axis; a first support that is located at an upper end of the body; and a second support that is located at a lower end of the body.

The first support includes first protrusions and is configured for movement about a reference axis that extends in parallel relation to the longitudinal axis. The first protrusions are configured for engagement with the image capture device and extend in parallel relation to the longitudinal axis.

The second support is reconfigurable between a collapsed configuration, in which the second support defines a grip for the image capture device, and an expanded configuration, in which the second support defines a freestanding base such that the accessory and the image capture device are supportable on a surface. The second support includes: a first leg that is radially movable in relation to the body; a second leg that is radially movable in relation to the body; and a third leg that is radially fixed in relation to the body, wherein the first leg, the second leg, and the third leg cooperate to define the grip when the second support is in the collapsed configuration and cooperate to define the freestanding base in the expanded configuration via contact with the surface.

In certain embodiments, the first leg and the second leg may be spaced radially from the body when the second support is in the expanded configuration.

In certain embodiments, the body and the first support may define a gap therebetween that allows for axial movement of the first support in relation to the body between discrete positions.

In certain embodiments, the first protrusions may be configured for engagement with second protrusions that extend from the image capture device.

In certain embodiments, the first support may include: a first finger; a second finger that is spaced laterally from the first finger so as to define a first channel therebetween; and a third finger that is spaced laterally from the second finger so as to define a second channel therebetween.

In certain embodiments, the second protrusions may include a fourth finger that is configured for insertion into the first channel and a fifth finger that is configured for insertion into the second channel.

In certain embodiments, the fifth finger may be spaced laterally from the fourth finger so as to define a third channel therebetween that is configured to receive the second finger.

In another aspect of the present disclosure, an accessory is disclosed for an image capture device. The accessory includes: a body defining a longitudinal axis; a first support that is located at an upper end of the body; and an expandable second support that is located at a lower end of the body.

The first support includes first protrusions that extend longitudinally and which are configured for engagement with second protrusions that extend longitudinally from the image capture device.

The expandable second support includes a first leg, which is pivotable in relation to the body, and a second leg, which is non-pivotable in relation to the body. The first leg includes a first configuration, and the second leg includes a second configuration that is different than the first configuration.

In certain embodiments, the first support may be movable in relation to the body.

In certain embodiments, the first support may be movable between discrete positions.

In certain embodiments, the body and the first support may define a gap therebetween that allows for axial movement of the first support in relation to the body.

In certain embodiments, the body may include an upper surface that defines a recess which is configured to receive the first support.

In certain embodiments, the first support may include a lower portion that is configured for reception by the recess in the upper surface of the body.

In certain embodiments, the recess in the upper surface of the body and the lower portion of the first support may define corresponding circular configurations.

In certain embodiments, the lower portion of the first support may define a bottom surface that includes planar sections.

In another aspect of the present disclosure, a method is disclosed for using an accessory with an image capture device. The method includes: connecting a first support that is located at an upper end of a body of the accessory to the image capture device; moving the first support in relation to the body; and reconfiguring a second support that is located at a lower end of the body between a collapsed configuration, in which the second support defines a grip for the image capture device, and an expanded configuration, in which the second support defines a freestanding base such that the accessory and the image capture device are supportable on a surface.

The second support includes a first leg and a second leg that each have a generally identical first configuration and a third leg that has a second configuration which is different than the first configuration, wherein the first leg, the second leg, and the third leg cooperate to define the freestanding base in the expanded configuration via contact with the surface.

In certain embodiments, moving the first support in relation to the body may include moving the first support within a gap that is defined between the body and the first support.

In certain embodiments, moving the first support in relation to the body may include moving the first support about a reference axis that extends in parallel relation to a longitudinal axis of the body.

In certain embodiments, reconfiguring the second support may include pivoting the first leg in relation to the body about a first axis that extends in transverse relation to the reference axis and pivoting the second leg in relation to the body about second axis that extends in transverse relation to both the reference axis and the first axis.

In certain embodiments, the method may further include stabilizing the accessory on the surface by bracing the accessory using the third leg.

In certain embodiments, the method may further include providing the grip for the image capture device by reconfiguring the second support into the collapsed configuration.

In certain embodiments, the grip may include the first leg, the second leg, and the third leg.

BRIEF DESCRIPTION OF THE DRAWINGS

The present disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 4A and 4B are front, perspective views of an accessory according to the principles of the present disclosure shown connected to variations on the image capture device seen in FIGS. 1A-1B.

FIG. 11 is a partial, side, perspective view of the accessory illustrating a second support shown in a stowed configuration.

FIG. 12 is a partial, side, perspective view of the accessory with the second support shown in a deployed configuration.

DETAILED DESCRIPTION

Figure 1A:
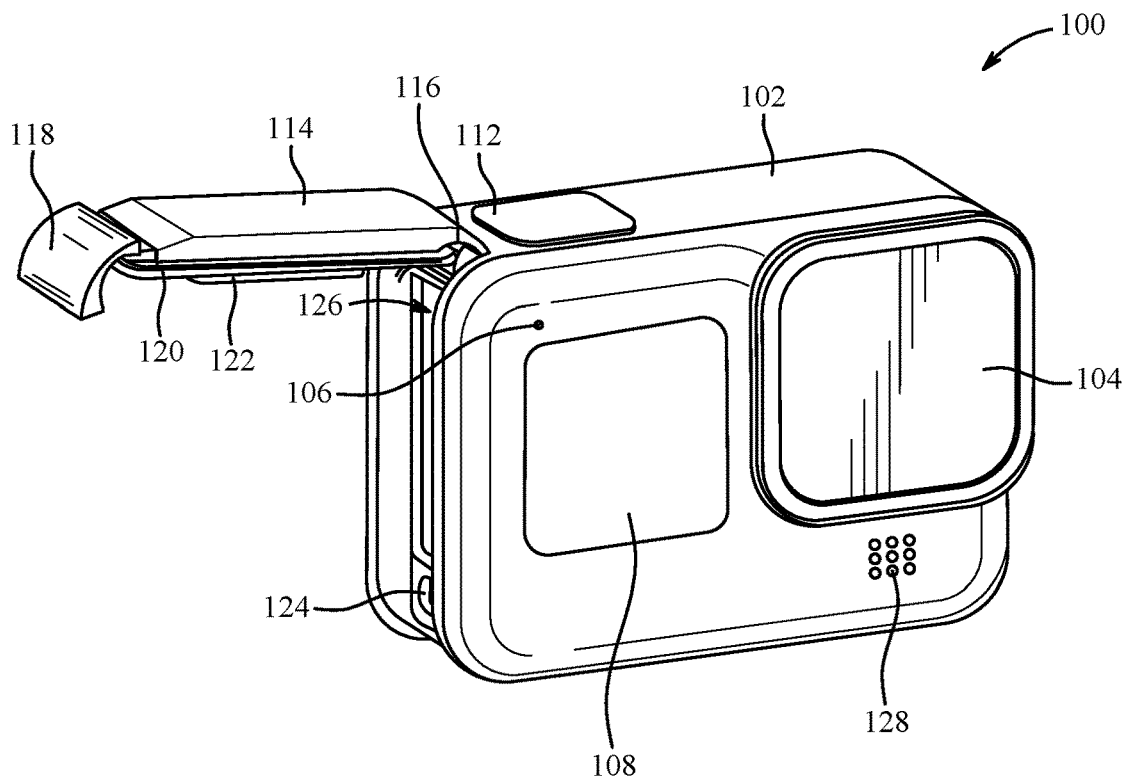
FIGS. 1A-B are isometric views of an example of an image capture device.

The present disclosure relates to an accessory for an image capture device that includes a body with an integrated power supply (e.g., a battery) and a variety of supports that allow for connection of the image capture device to the accessory and utilization across a variety of use cases. For example, the accessory described herein includes a first (upper) support with protrusions (e.g., fingers) that are configured for connection to a corresponding structure on the image capture device; a second (intermediate) support that is pivotably reconfigurable between a stowed configuration and a deployed configuration to facilitate connection of the accessory and the image capture device to a corresponding mounting structure on an ancillary product (accessory); and a third (lower) support that is reconfigurable between a collapsed (closed) configuration, in which the accessory acts as (provides) a grip for the image capture, and an expanded (open) configuration, in which the accessory acts as (provides) a freestanding base (e.g., a stand, tripod) for the image capture device.

The first support is rotatable through an unlimited range of motion about a (vertical) axis of rotation that extends through the body of the accessory in generally parallel relation to a longitudinal axis defined by the body of the accessory. The first support cooperates with indexing members that are located between the first support and the body of the accessory to define (a set, series, plurality of) secured rotational positions for the first support and, thus, the image capture device. For example, it is envisioned that the first support and the image capture device may be positioned in one of four discrete rotational positions that are separated by (approximately) 90 degrees.

The second support includes protrusions (e.g., fingers) that are configured for connection to a corresponding structure on an ancillary product (accessory) such as, for example, a wrist strap, a vest, a hat, a helmet, a surfboard, the handlebars of a motorcycle, etc. During reconfiguration of the second support between the stowed configuration and the deployed configuration, the protrusions are movable into and out of the accessory about a pivot axis that extends transversely (e.g., orthogonally, perpendicularly) in relation to the longitudinal axis of the accessory and the axis of rotation for the first support. The second support includes a (first) biasing member (e.g., one or more torsion springs) that bias the second support towards the deployed configuration and a locking mechanism that is configured for engagement with the protrusions. The locking mechanism is movable between a locked position and an unlocked position and is biased toward the locked position by a (second) biasing member (e.g., one or more compression springs). In the locked position, the locking mechanism engages the protrusions to maintain the configuration of the second support (whether stowed or deployed), and in the unlocked position, the locking mechanism is disengaged (separated) from the protrusions to allow for reconfiguration of the second support between the stowed configuration and the deployed configuration. More specifically, the protrusions include a (first) locking detent (recess) that is configured for engagement with the locking mechanism when the second support is in the stowed configuration and a (second) locking detent (recess) that is configured for engagement with the locking mechanism when the second support is in the deployed configuration.

The third support includes first and second legs that are pivotable about respective (intersecting) axes that extend transversely in relation to the axis of rotation for the first support and the pivot axis for the second support. The third support is configured such that, in the collapsed configuration, the first and second legs are positioned generally adjacent to the body of the accessory, and such that, in the expanded configuration, the first leg and the second leg are spaced from the body of the accessory. In the expanded configuration, the first and second legs cooperate with a lower end of the body to provide the freestanding base for the image capture device.

To improve the overall appearance and functionality of the accessory, the accessory is configured such that the second support, the first leg, and the second leg are oriented along a common (e.g., rear) surface of the body. When the second support is in the stowed configuration and the third support is in the collapsed configuration, the body defines a first pair of opposing (generally planar) surfaces and a second pair of opposing (non-planar, arcuate) surfaces that connect the first pair of opposing surfaces, whereby the accessory includes a (generally) ovate transverse (horizontal) cross-sectional configuration and, more specifically, a (generally) pill-shaped or stadium cross-sectional configuration.

The accessory is configured for both wired and wireless connection to the image capture device. To facilitate various command and control operations and, thus, operation of the image capture device, the accessory includes a control panel that is located between the second support and an electrical interface that is located on an opposite surface of the body as the second support. The particular location of the control panel not only facilitates access thereto when the accessory is connected to the ancillary product (accessory), but single-handed operation of the image capture device.

Figure 1B:
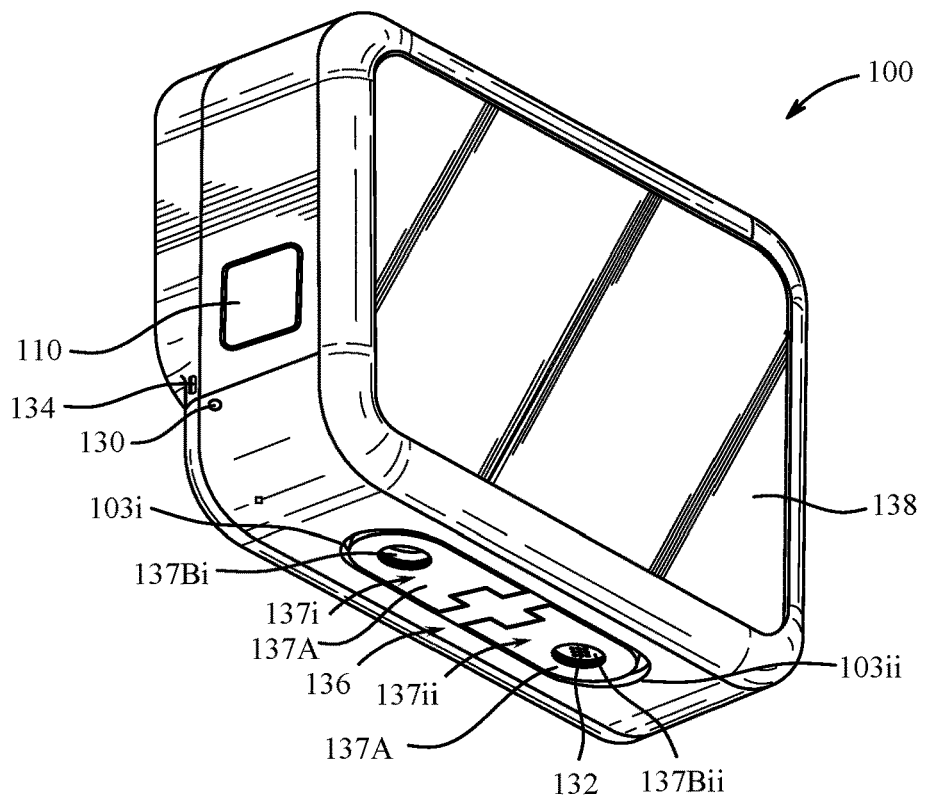

FIGS. 1A-B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include an interconnect mechanism 136 for connecting the image capture device 100 to an accessory, handle grip, or other securing device. In the example shown in FIG. 1B, the interconnect mechanism 136 includes folding protrusions 137 (e.g., fingers 137A) that are configured to move between a nested or collapsed position as shown and an extended or open position (not shown) that facilitates coupling of the protrusions 137 to mating protrusions of other devices such as accessories, handle grips, mounts, clips, or like devices, as discussed in further detail below.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
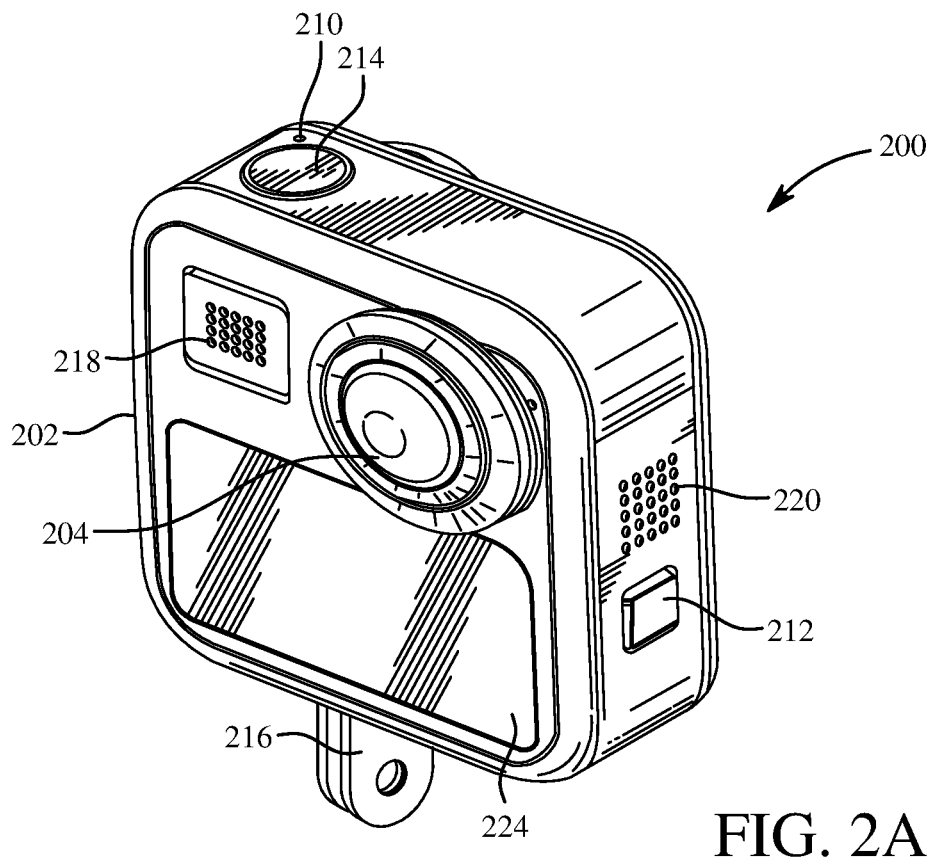
FIGS. 2A-B are isometric views of another example of an image capture device.
Figure 2B:
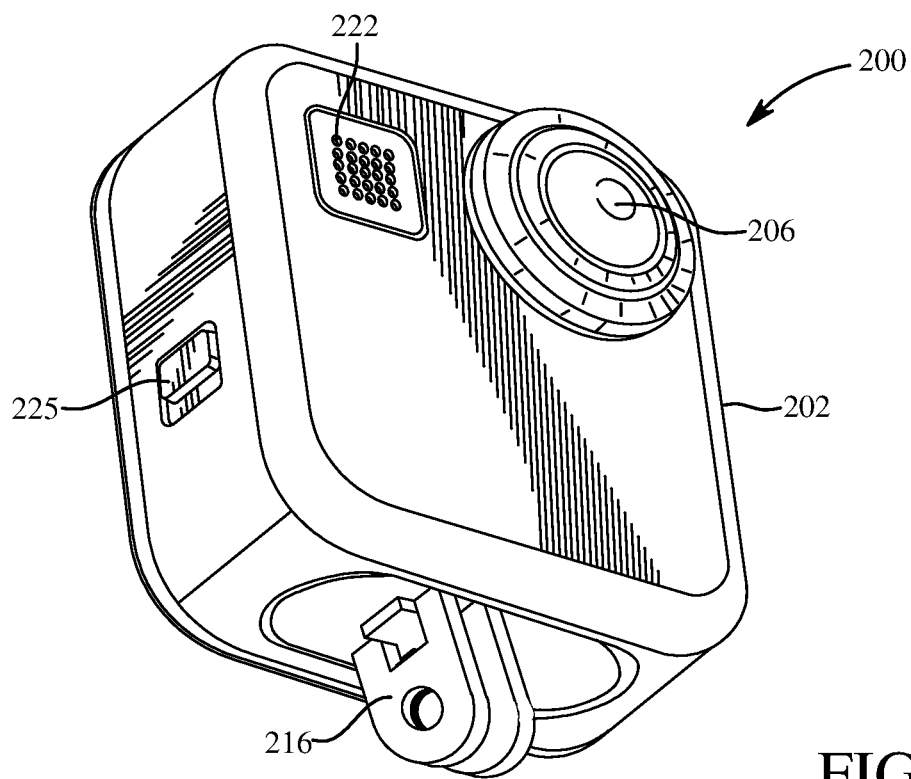

FIGS. 2A-B illustrate another example of an image capture device 200. The image capture device 200 includes a body 202 and two camera lenses 204 and 206 disposed on opposing surfaces of the body 202, for example, in a back-to-back configuration, Janus configuration, or offset Janus configuration. The body 202 of the image capture device 200 may be made of a rigid material such as plastic, aluminum, steel, or fiberglass.

The image capture device 200 includes various indicators on the front of the surface of the body 202 (such as LEDs, displays, and the like), various input mechanisms (such as buttons, switches, and touch-screen mechanisms), and electronics (e.g., imaging electronics, power electronics, etc.) internal to the body 202 that are configured to support image capture via the two camera lenses 204 and 206 and/or perform other imaging functions.

The image capture device 200 includes various indicators, for example, LEDs 208, 210 to indicate a status of the image capture device 100. The image capture device 200 may include a mode button 212 and a shutter button 214 configured to allow a user of the image capture device 200 to interact with the image capture device 200, to turn the image capture device 200 on, and to otherwise configure the operating mode of the image capture device 200. It should be appreciated, however, that, in alternate embodiments, the image capture device 200 may include additional buttons or inputs to support and/or control additional functionality.

The image capture device 200 may include an interconnect mechanism 216 for connecting the image capture device 200 to a handle grip or other securing device. In the example shown in FIGS. 2A and 2B, the interconnect mechanism 216 includes folding protrusions configured to move between a nested or collapsed position (not shown) and an extended or open position as shown that facilitates coupling of the protrusions to mating protrusions of other devices such as handle grips, mounts, clips, or like devices.

The image capture device 200 may include audio components 218, 220, 222 such as microphones configured to receive and record audio signals (e.g., voice or other audio commands) in conjunction with recording video. The audio component 218, 220, 222 can also be configured to play back audio signals or provide notifications or alerts, for example, using speakers. Placement of the audio components 218, 220, 222 may be on one or more of several surfaces of the image capture device 200. In the example of FIGS. 2A and 2B, the image capture device 200 includes three audio components 218, 220, 222, with the audio component 218 on a front surface, the audio component 220 on a side surface, and the audio component 222 on a back surface of the image capture device 200. Other numbers and configurations for the audio components are also possible.

The image capture device 200 may include an interactive display 224 that allows for interaction with the image capture device 200 while simultaneously displaying information on a surface of the image capture device 200. The interactive display 224 may include an I/O interface, receive touch inputs, display image information during video capture, and/or provide status information to a user. The status information provided by the interactive display 224 may include battery power level, memory card capacity, time elapsed for a recorded video, etc.

The image capture device 200 may include a release mechanism 225 that receives a user input to in order to change a position of a door (not shown) of the image capture device 200. The release mechanism 225 may be used to open the door (not shown) in order to access a battery, a battery receptacle, an I/O interface, a memory card interface, etc. (not shown) that are similar to components described in respect to the image capture device 100 of FIGS. 1A and 1B.

In some embodiments, the image capture device 200 described herein includes features other than those described. For example, instead of the I/O interface and the interactive display 224, the image capture device 200 may include additional interfaces or different interface features. For example, the image capture device 200 may include additional buttons or different interface features, such as interchangeable lenses, cold shoes, and hot shoes that can add functional features to the image capture device 200.

Figure 3:
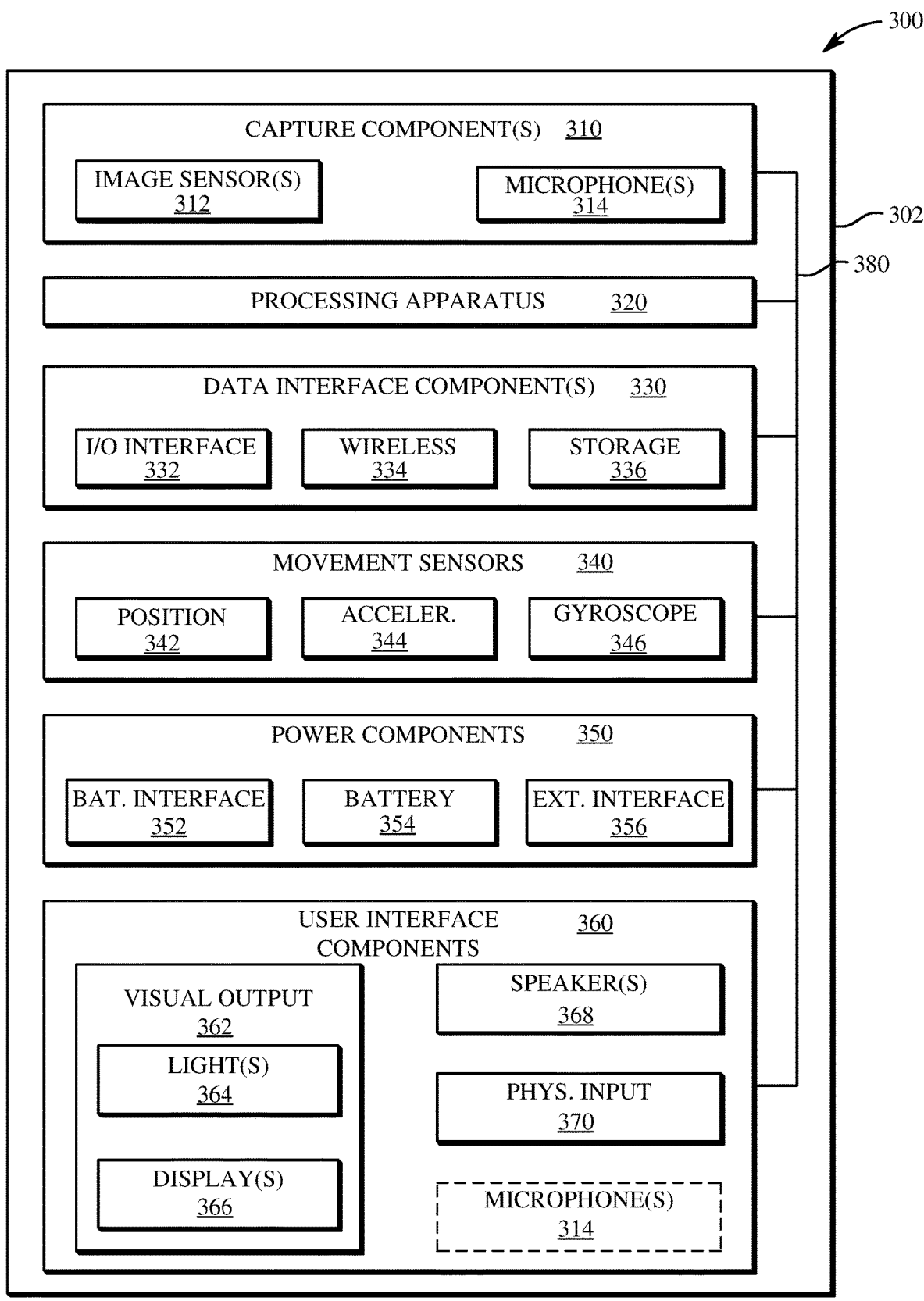
FIG. 3 is a block diagram of electronic components of an image capture device.

FIG. 3 is a block diagram of electronic components in an image capture device 300. The image capture device 300 may be a single-lens image capture device, a multi-lens image capture device, or variations thereof, including an image capture device with multiple capabilities such as use of interchangeable integrated sensor lens assemblies. The description of the image capture device 300 is also applicable to the image capture devices 100, 200 of FIGS. 1A-B and 2A-B.

The image capture device 300 includes a body 302 which includes electronic components such as capture components 310, a processing apparatus 320, data interface components 330, movement sensors 340, power components 350, and/or user interface components 360.

The capture components 310 include one or more image sensors 312 for capturing images and one or more microphones 314 for capturing audio.

The image sensor(s) 312 is configured to detect light of a certain spectrum (e.g., the visible spectrum or the infrared spectrum) and convey information constituting an image as electrical signals (e.g., analog or digital signals). The image sensor(s) 312 detects light incident through a lens coupled or connected to the body 302. The image sensor(s) 312 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors. Image signals from the image sensor(s) 312 may be passed to other electronic components of the image capture device 300 via a bus 380, such as to the processing apparatus 320. In some implementations, the image sensor(s) 312 includes a digital-to-analog converter. A multi-lens variation of the image capture device 300 can include multiple image sensors 312.

The microphone(s) 314 is configured to detect sound, which may be recorded in conjunction with capturing images to form a video. The microphone(s) 314 may also detect sound in order to receive audible commands to control the image capture device 300.

The processing apparatus 320 may be configured to perform image signal processing (e.g., filtering, tone mapping, stitching, and/or encoding) to generate output images based on image data from the image sensor(s) 312. The processing apparatus 320 may include one or more processors having single or multiple processing cores. In some implementations, the processing apparatus 320 may include an application specific integrated circuit (ASIC). For example, the processing apparatus 320 may include a custom image signal processor. The processing apparatus 320 may exchange data (e.g., image data) with other components of the image capture device 300, such as the image sensor(s) 312, via the bus 380.

The processing apparatus 320 may include memory, such as a random-access memory (RAM) device, flash memory, or another suitable type of storage device, such as a non-transitory computer-readable memory. The memory of the processing apparatus 320 may include executable instructions and data that can be accessed by one or more processors of the processing apparatus 320. For example, the processing apparatus 320 may include one or more dynamic random-access memory (DRAM) modules, such as double data rate synchronous dynamic random-access memory (DDR SDRAM). In some implementations, the processing apparatus 320 may include a digital signal processor (DSP). More than one processing apparatus may also be present or associated with the image capture device 300.

The data interface components 330 enable communication between the image capture device 300 and other electronic devices, such as a remote control, a smartphone, a tablet computer, a laptop computer, a desktop computer, or a storage device. For example, the data interface components 330 may be used to receive commands to operate the image capture device 300, transfer image data to other electronic devices, and/or transfer other signals or information to and from the image capture device 300. The data interface components 330 may be configured for wired and/or wireless communication. For example, the data interface components 330 may include an I/O interface 332 that provides wired communication for the image capture device, which may be a USB interface (e.g., USB type-C), a high-definition multimedia interface (HDMI), or a FireWire interface. The data interface components 330 may include a wireless data interface 334 that provides wireless communication for the image capture device 300, such as a Bluetooth interface, a ZigBee interface, and/or a Wi-Fi interface. The data interface components 330 may include a storage interface 336, such as a memory card slot configured to receive and operatively couple to a storage device (e.g., a memory card) for data transfer with the image capture device 300 (e.g., for storing captured images and/or recorded audio and video).

The movement sensors 340 may detect the position and movement of the image capture device 300. The movement sensors 340 may include a position sensor 342, an accelerometer 344, or a gyroscope 346. The position sensor 342, such as a global positioning system (GPS) sensor, is used to determine a position of the image capture device 300. The accelerometer 344, such as a three-axis accelerometer, measures linear motion (e.g., linear acceleration) of the image capture device 300. The gyroscope 346, such as a three-axis gyroscope, measures rotational motion (e.g., rate of rotation) of the image capture device 300. Other types of movement sensors 340 may also be present or associated with the image capture device 300.

The power components 350 may receive, store, and/or provide power for operating the image capture device 300. The power components 350 may include a battery interface 352 and a battery 354. The battery interface 352 operatively couples to the battery 354, for example, with conductive contacts to transfer power from the battery 354 to the other electronic components of the image capture device 300. The power components 350 may also include an external interface 356, and the power components 350 may, via the external interface 356, receive power from an external source, such as a wall plug or external battery, for operating the image capture device 300 and/or charging the battery 354 of the image capture device 300. In some implementations, the external interface 356 may be the I/O interface 332. In such an implementation, the I/O interface 332 may enable the power components 350 to receive power from an external source over a wired data interface component (e.g., a USB type-C cable).

The user interface components 360 may allow the user to interact with the image capture device 300, for example, providing outputs to the user and receiving inputs from the user. The user interface components 360 may include visual output components 362 to visually communicate information and/or present captured images to the user. The visual output components 362 may include one or more lights 364 and/or more displays 366. The display(s) 366 may be configured as a touch screen that receives inputs from the user. The user interface components 360 may also include one or more speakers 368. The speaker(s) 368 can function as an audio output component that audibly communicates information and/or presents recorded audio to the user. The user interface components 360 may also include one or more physical input interfaces 370 that are physically manipulated by the user to provide input to the image capture device 300. The physical input interfaces 370 may, for example, be configured as buttons, toggles, or switches. The user interface components 360 may also be considered to include the microphone(s) 314, as indicated in dotted line, and the microphone(s) 314 may function to receive audio inputs from the user, such as voice commands.

Figure 4B:
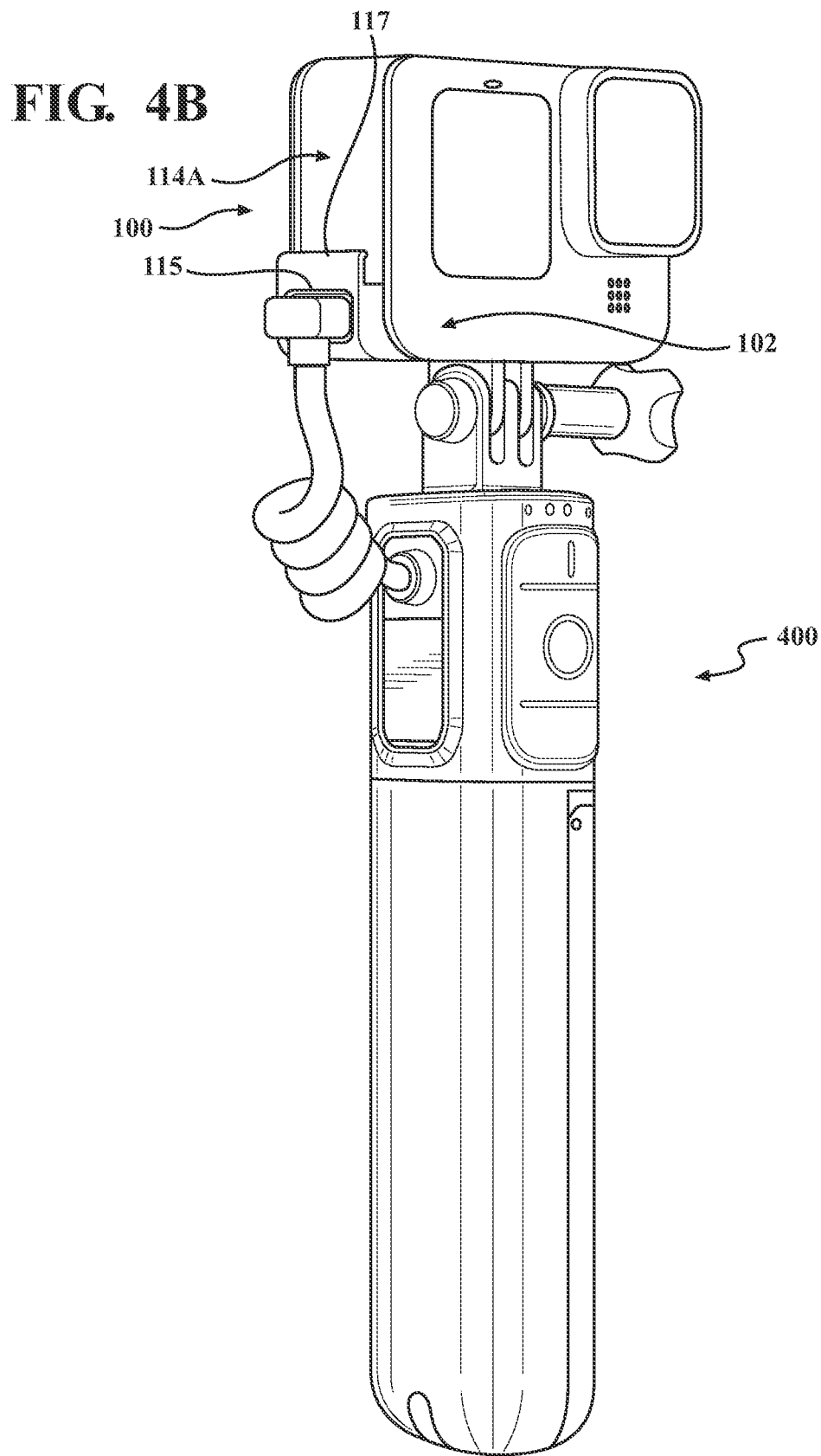
Figure 5:
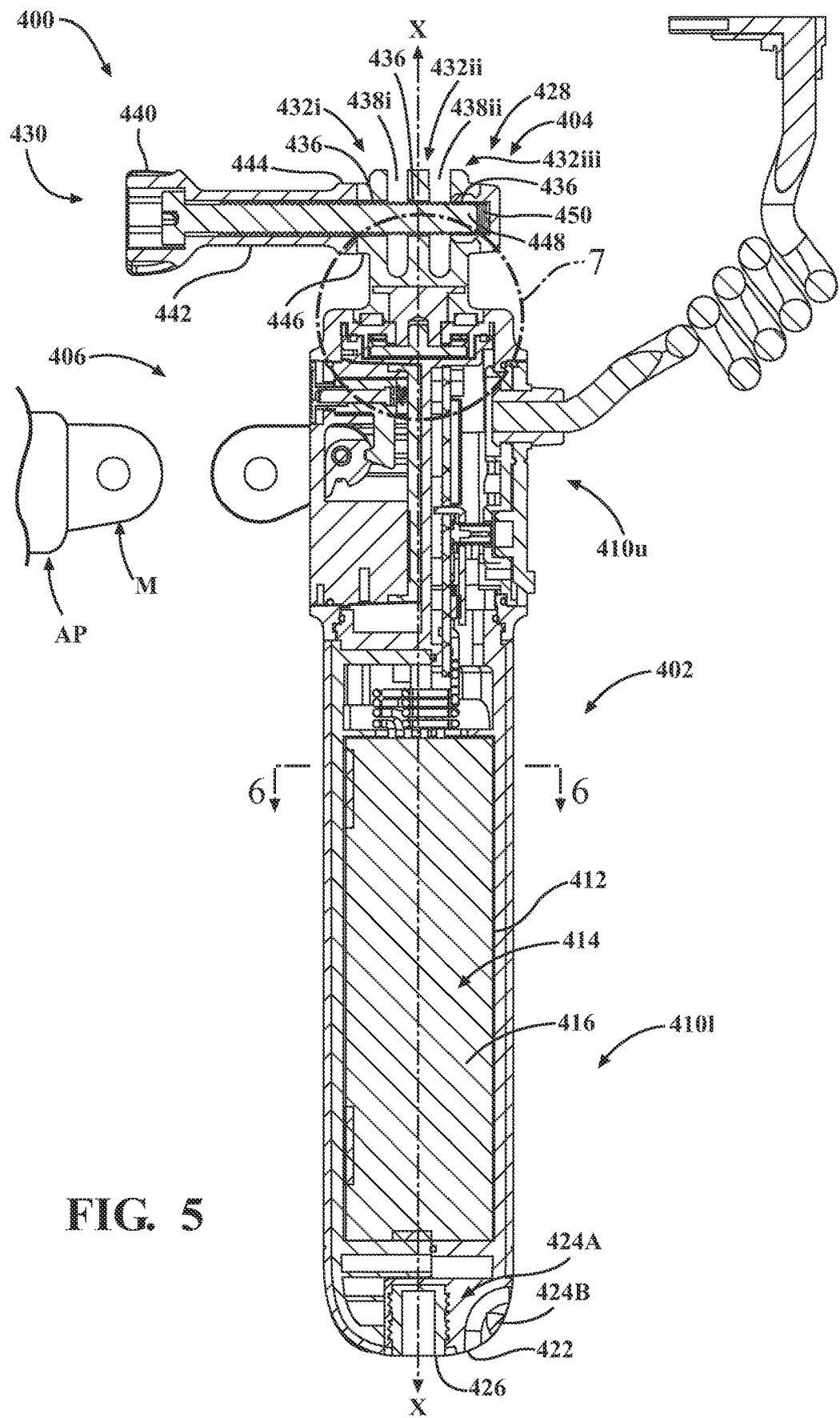
FIG. 5 is a longitudinal (vertical) cross-sectional view of the accessory.
Figure 6:
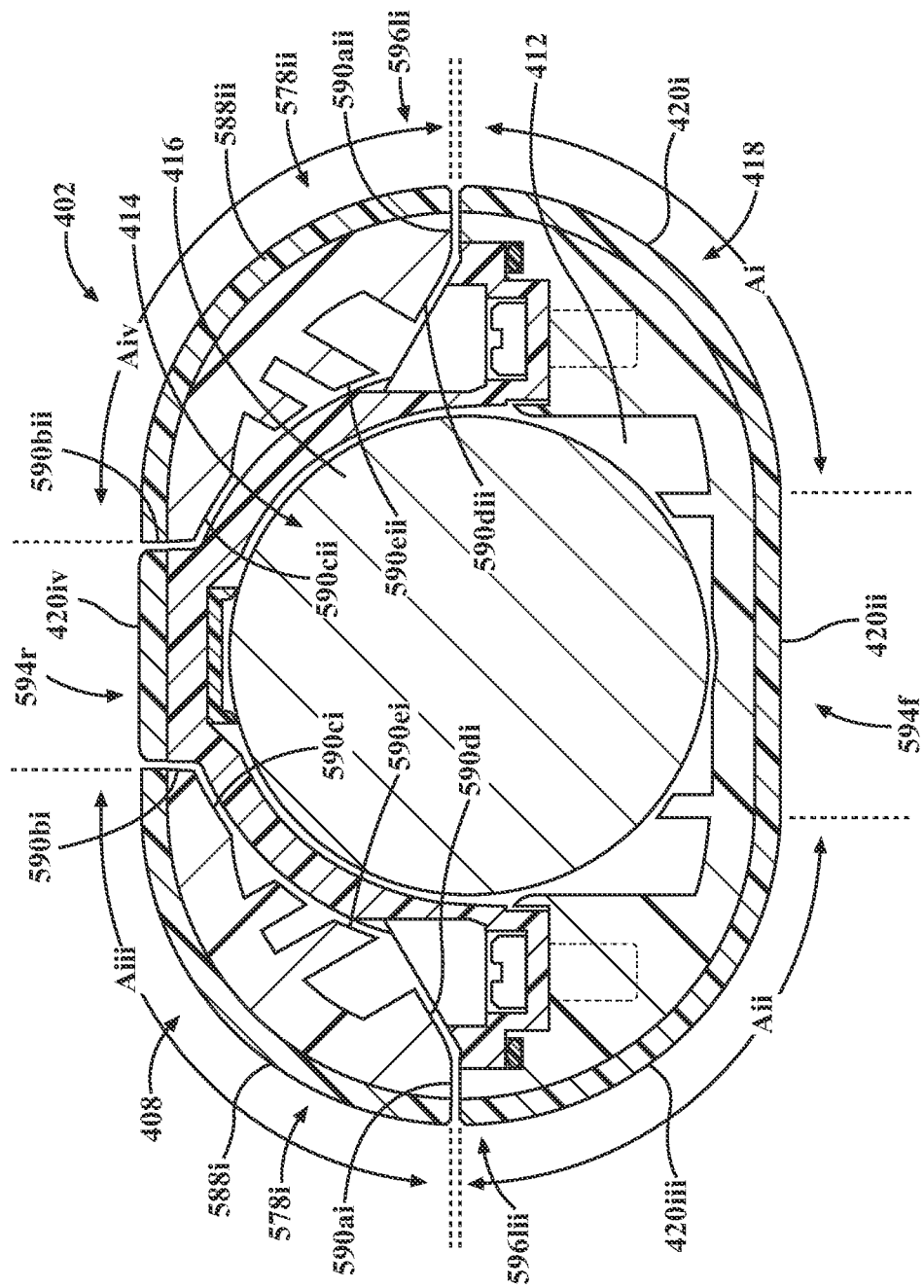
FIG. 6 is a transverse (horizontal) cross-sectional view of the accessory taken through line 6-6 in FIG. 5.

Referring now to FIGS. 4A-6, one embodiment of the presently disclosed accessory will be discussed, which is identified by the reference character 400. More specifically, FIGS. 4A and 4B provide front, perspective views of the accessory 400 shown connected to variations on the image capture device 100; FIG. 5 provides a longitudinal (vertical) cross-sectional view of the accessory 400 (separated from the image capture device 100); and FIG. 6 provides a transverse (horizontal) cross-sectional view of the accessory 400. Although generally discussed in connection with the image capture device 100 herein below, it should be appreciated that the accessory 400 may be configured for use with any image capture device, such as the various embodiments described herein (e.g., the aforedescribed image capture devices 200, 300).

In the embodiment of the disclosure seen in FIG. 4A, the image capture device 100 is shown connected to an expansion module 372, which extends about the body 102 and supports and/or augments the functionality of the image capture device 100. For example, it is envisioned that the expansion module 372 may connect to the image capture device 100 so as to provide additional imaging and/or audio capabilities (e.g., microphones), lighting capabilities, display capabilities, one or more additional connection ports (e.g., HDMI, USB-C, or other ports), one or more additional mounts (e.g., for supplemental lighting, microphones, or LCD screens), etc.

In the embodiment of the disclosure seen in FIG. 4B, the image capture device 100 includes an alternate embodiment of the aforedescribed door 114 (FIG. 1A), which is identified by the reference character 114A. Like the door 114, the door 114A provides access to the input-output (I/O) interface 124 (FIG. 1A) and the battery receptacle 126 and creates a watertight interface with the body 102 of the image capture device 100. The door 114A, however, includes an access port 115, which provides a passthrough for power and data to support connection of the image capture device 100 to the accessory 400, and a clip 117, which is configured for releasable connection to a power cable (or other such media cable or cord) extending between the image capture device 100 and the accessory 400 (e.g., to route and/or stow the power cable). Further details regarding the door 114A can be ascertained through reference to U.S. patent application Ser. No. 29/770,538, filed on Feb. 12, 2021, the entire content of which is hereby incorporated by reference.

The accessory 400 includes: a body 402; a first (upper) support 404; a second (intermediate) support 406; and a third (lower) support 408. As discussed in detail below, the supports 404, 406, 408 allow for the connection of the image capture device 100 to the accessory 400 and utilization of the image capture device 100 and the accessory 400 across a variety of use cases (e.g., hand-held use, hands-free use, wearable use, etc.).

The body 402 includes respective upper and lower ends 410u, 410l and defines an overall length L (FIG. 5) that extends along a longitudinal axis X. The body 402 defines an internal compartment 412 (FIG. 5) that is configured to receive (accommodate) a power supply 414 (e.g., a battery 416) such that the power supply 414 is integrated into the accessory 400. More specifically, as seen in FIG. 5, the power supply 414 is accommodated within the lower end 410l of the body 402 (either partially or entirely, depending upon the particular configuration of the power supply 414) and is configured to selectively communicate electrical energy to the image capture device 100, as discussed in further detail below.

With particular reference to FIG. 6, the body 402 defines an outer wall 418 that includes (a set, series, plurality of) segments 420. More specifically, the outer wall 418 includes: a first segment 420i having an arcuate configuration that defines an arc length Ai spanning approximately 90 degrees; a second (generally) linear segment 420ii that extends from the segment 420i; a third segment 420iii that extends from the segment 420ii and which has an arcuate configuration that defines an arc length Aii spanning approximately 90 degrees; and a fourth (generally) linear segment 420iv that is positioned (generally) opposite to the second segment 420ii.

The lower end 410l of the body 402 defines a foot portion 422 that is configured to support the body 402 on a surface, as discussed in further detail below. In certain embodiments of the present disclosure, such as that illustrated in FIG. 5, for example, it is envisioned that the foot portion 422 may include an insert 424A (e.g., a mount 426) that is configured to facilitate connection of the accessory 400 to other accessories, products, or the like (e.g., external tripods). It should be appreciated, however, that the insert 424 may be positioned in any suitable location (e.g., dependent upon the configuration of the accessories, products, or the like intended for connection to the accessory 400, the intended use of the accessories, products, or the like, etc.). It is also envisioned that the foot portion 422 may include an anchor 424B (FIG. 4A) that is configured for (fixed or removable) connection to a tether, a wrist strap, or the like.

The first support 404 is located at (supported by) the upper end 410u of the body 402 and includes a (first) engagement member 428 that is configured for releasable engagement with (coupling to) the interconnect mechanism 136 (FIG. 1B) on the image capture device 100 and an adjustable fastener 430, which cooperatively facilitate connection, disconnection, and securement of the image capture device 100 to the accessory 400.

The engagement member 428 includes (a first set, series, plurality of) protrusions 432 (e.g., fingers 434) that interface (engage) with (connect to) the protrusions 137 (FIGS. 1B, 4) on the image capture device 100. The protrusions 432 each include an opening 436 (FIG. 5) and define channels 438 therebetween that are configured to receive the protrusions 137 such that the protrusions 137 are received by (positioned within) the channels 438, thereby aligning the openings 436 with corresponding openings 137B (FIG. 1B) in the protrusions 137. While the first support 404 is shown as including three protrusions 432i, 432ii, 432iii and two channels 438i, 438ii in the embodiment illustrated throughout the figures, it should be appreciated that the particular numbers of protrusions 432 and channels 438 may be varied in alternate embodiments without departing from the scope of the present disclosure (e.g., depending on the number of protrusions 137 included on the image capture device 100).

The fastener 430 is configured to secure the image capture device 100 to the accessory 400 and apply a variable compressive force to the protrusions 137, 432 to allow for adjustment in the position of the image capture device 100 (relative to the accessory 400). The fastener 430 includes a handle 440 (FIG. 5) and a shank 442 that is secured to the handle 440 such that rotation of the handle 440 causes corresponding rotation of the shank 442.

The handle 440 defines an end cap 444 that is configured for engagement (contact) with the protrusion 432i. More specifically, the end cap 444 is configured for engagement (contact) with an external support surface 446 (FIG. 5) defined by the protrusion 432i, which inhibits (if not entirely prevents) relative movement between the end cap 444 and the protrusion 432i during adjustment of the fastener 430, as discussed in further detail below.

The shank 442 is configured for insertion through the openings 436, 137B in the protrusions 432, 137, respectively, and includes a threaded operative end 448 that is configured for engagement with corresponding internal threading 450 on the protrusion 432iii. The threaded engagement between the shank 442 and the protrusion 432iii allows for connection and disconnection of the fastener 430 (e.g., to allow for removal of the fastener 430 and connection of the image capture device 100 to the accessory 400) as well as compression of the protrusions 432, 137 upon rotation of the shank 442 via the handle 440 (e.g., during adjustment of the fastener 430). More specifically, rotation of the handle 440 (and, thus, the shank 442) in a first direction (e.g., clockwise) causes engagement of the operative end 448 and the internal threading 450 on the protrusion 432iii and tightens the fastener 430. Oppositely, rotation of the handle 440 (and, thus, the shank 442) in a second direction (e.g., counter-clockwise) loosens the fastener 430 and results in disengagement of the operative end 448 and the internal threading 450 on the protrusion 432iii, which allows for removal of the fastener 430 and separation of the image capture device 100 from the accessory 400).

Due to the engagement (contact) between the end cap 444 and the external support surface 446, tightening of the fastener 430 causes (laterally) inward deflection of the protrusions 432i, 432iii and the protrusions 137 (e.g., movement towards the protrusion 432ii) to thereby secure the relative positions of the image capture device 100 and the accessory 400 via compression of the first support 404 and the image capture device 100 and frictional engagement between the protrusions 432, 137. Oppositely, loosening of the fastener 430 alleviates compression on the first support 404 and the image capture device 100 and allows the protrusions 432i, 432iii and the protrusions 137 to move outwardly (e.g., away from the protrusion 432ii) and return to their initial positions, which permits relative movement between the image capture device 100 and the accessory 400. For example, in the illustrated embodiment, the first support 404 and the image capture device 100 are configured to allow for bi-directional tilting of the image capture device 100 relative to the accessory 400 in opposing directions 1, 2 (FIG. 4A) (e.g., forward and rearward, left and right, etc.). More specifically, the first support 404 is configured to allow for tilting of the image capture device 100 through a range of motion that lies substantially within the range of approximately 180 degrees (e.g., approximately 90 degrees of tilt in each of the directions 1, 2), which is limited and defined by contact between the body 102 of the image capture device 100 and the first support 404 (and/or the body 402 of the accessory 400). It should be appreciated, however, that the tiltable range of motion may be increased or decreased as necessary or desired in alternate embodiments of the present disclosure by varying the particular configurations of the body 102 of the image capture device 100 and the first support 404 (and/or the body 402 of the accessory 400) (e.g., by adding or removing material therefrom).

Figure 7:
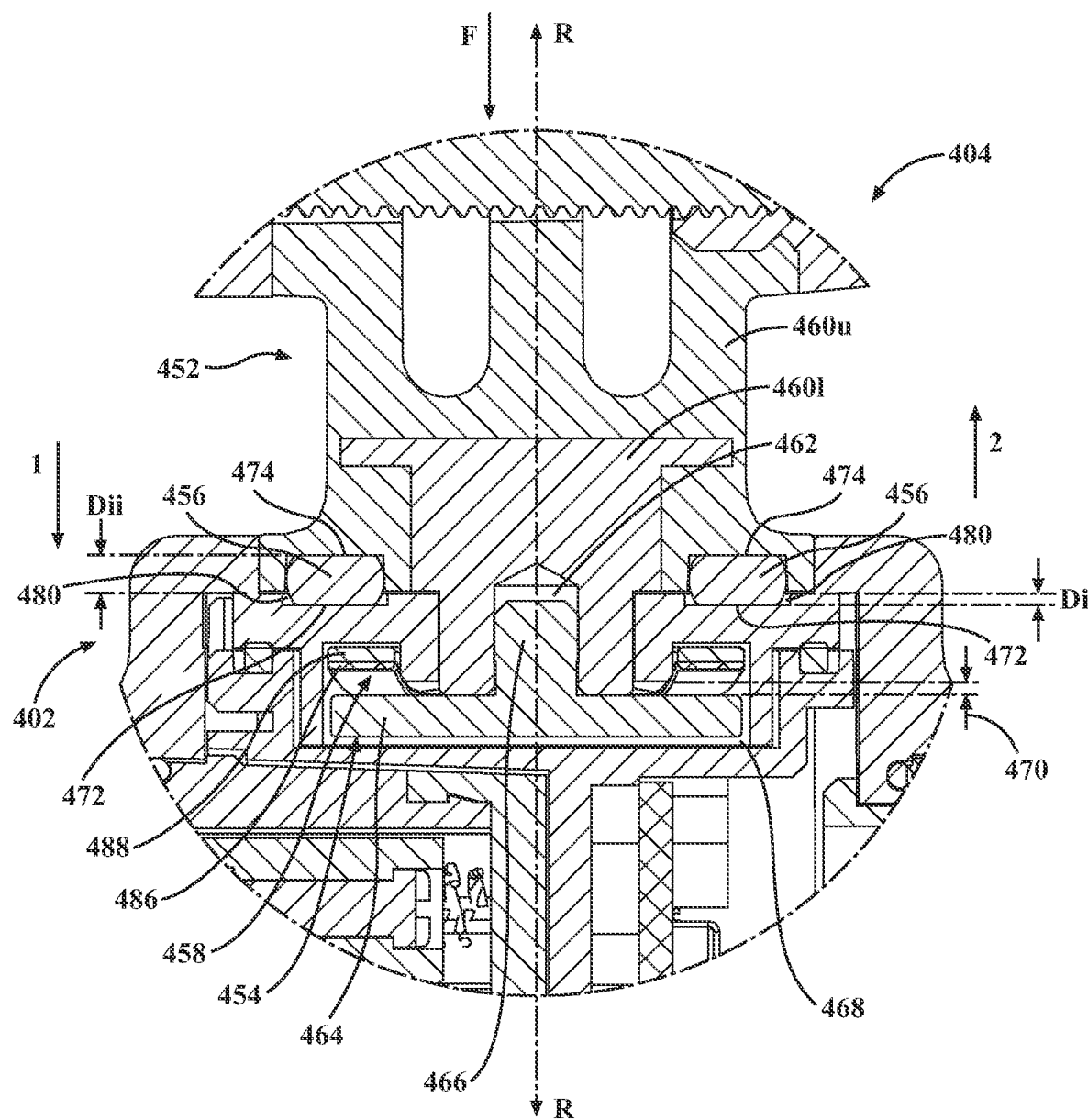
FIG. 7 is an enlargement of the corresponding area of detail identified in FIG. 5.
Figure 8:
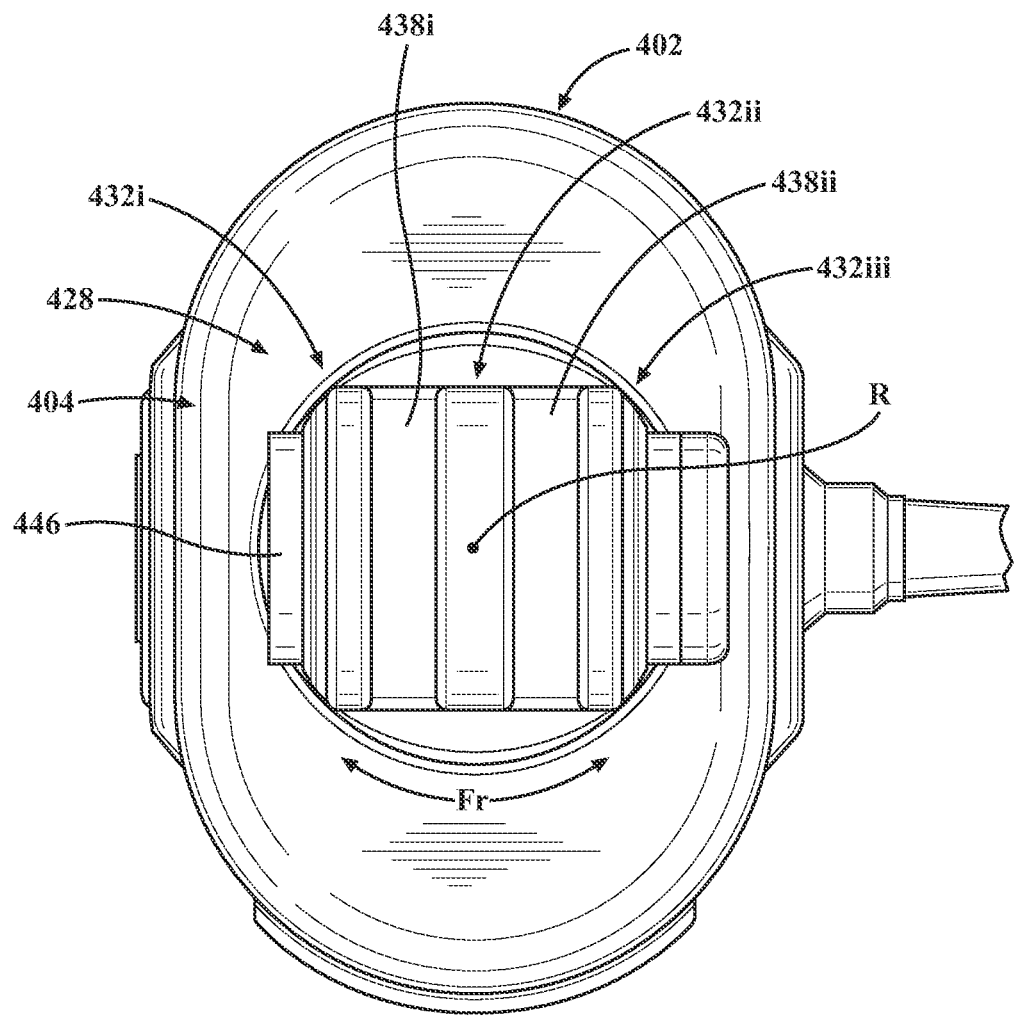
FIG. 8 is a top, plan view of the accessory illustrating a first support.
Figure 9:
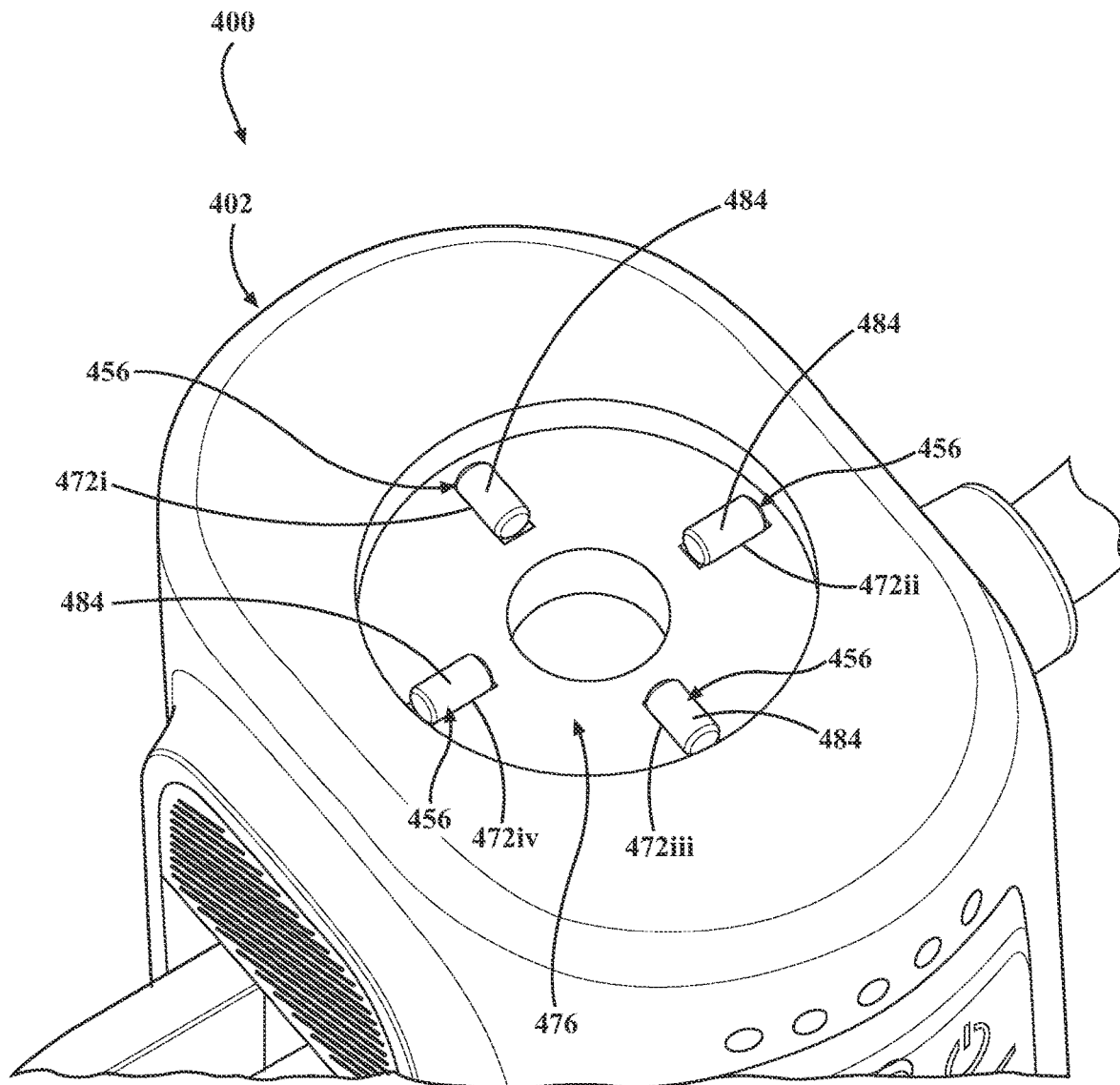
FIG. 9 is a partial, top, perspective view of the accessory with the first support removed.
Figure 10:
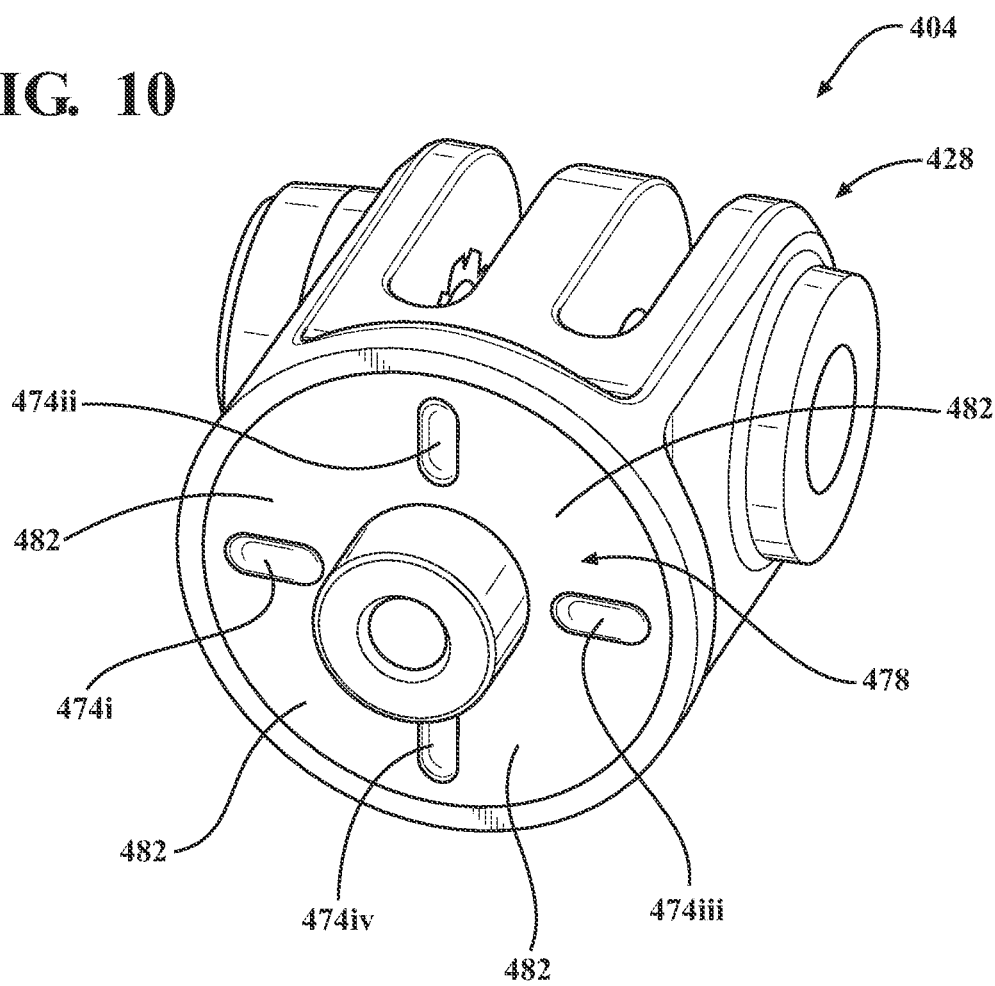
FIG. 10 is a bottom, perspective view of the first support.

Referring now to FIGS. 7-10 as well, the first support 404 is rotatable in relation to the body 402 of the accessory 400 about an axis of rotation R (FIGS. 7, 8) that extends through the body 402 in (generally) parallel relation to the longitudinal axis X (FIGS. 4, 5) through an unlimited range of motion, which allows for orientation of the image capture device 100 in a variety of rotationally offset positions. More specifically, FIG. 7 provides an enlargement of the corresponding area of detail identified in FIG. 5; FIG. 8 provides a top, plan view of the accessory 400 and the first support 404; FIG. 9 provides a top, perspective view of the accessory 400 with the first support 404 shown separated from the body 402 of the accessory 400; and FIG. 10 provides a bottom, perspective view of the first support 404. As seen in FIG. 7, the first support 404 includes: a housing 452; a base 454; (a set, series, plurality of) indexing members 456; and a biasing member 458.

The housing 452 includes an upper housing component 460*u* and a lower housing component 460*l* defining a chamber 462. In the particular embodiment illustrated, the upper and lower housing components 460*u*, 460*l* are configured as discrete members that are molded together. Alternate methods of manufacture of the housing 452 and/or connection of the housing components 460*u*, 460*l*, however, are also contemplated herein, as are embodiments in which the housing 452 may be unitarily (e.g., monolithically) formed.

The base 454 includes a platform 464 and a rivet 466 that extends (upwardly) from the platform 464 into the chamber 462 defined by the lower housing component 460*l*. Although shown as being integrally (e.g., unitarily, monolithically) formed in the illustrated embodiment, it is also envisioned that the platform 464 and the rivet 466 may be formed as discrete members that may be connected together in any suitable manner (e.g., via one or more mechanical fasteners, via an adhesive, via ultrasonic welding, etc.).

The platform 464 is positioned within a cavity 468 defined by the body 402 of the accessory 400 such that the base 454 is positioned (axially, vertically) between the housing 452 of the first support 404 and the body 402 so as to a gap 470 between the base 454 and the body 402. As discussed in further detail below, the gap 470 allows for relative axial (vertical) deflection of the first support 404 in relation to the body 402 during rotation of the first support 404 and defines the range of (axial) motion for the first support 404, the upper end of which is delimited by contact between the platform 464 and the body 402.

To reduce wear between the housing 452 and the rivet 466, it is envisioned that a variety of materials may be utilized. For example, in the illustrated embodiment, whereas the upper housing component 460*u* includes (e.g., is formed from) one or more plastic materials, the lower housing component 460*l* and the base 454 (e.g., the rivet 466) include (e.g., are formed from) one or more metallic materials.

In various embodiments of the present disclosure, it is envisioned that the housing 452 and the base 454 may rotate in unison during rotation of the first support 404 (e.g., via frictional and/or mechanical engagement between the rivet 466 and the lower housing component 460*l*). Alternatively, it is envisioned that the housing 452 and the base 454 may be configured such that the housing 452 is rotatable in relation to the base 454 (e.g., about the rivet 466) during rotation of the first support 404.

The body 402 of the accessory 400 and the housing 452 (e.g., the lower housing component 460*l*) include corresponding recesses 472, 474, respectively, which are spaced outwardly from the axis of rotation R and are configured for selectively alignment during rotation of the first support 404. More specifically, the recesses 472 extend into an upper surface 476 (FIG. 9) of the body 402 and the recesses 474 extend into a lower surface 478 (FIG. 10) of the lower housing component 460*l*. When rotationally aligned, the recesses 472, 474 collectively define chambers 480 (FIG. 7) that are configured to receive the indexing members 456, which correspond in number to the recesses 472, 474. When out of rotational alignment, the indexing members 456 are positioned between the recesses 472 in the upper surface 476 of the body 402 and (generally planar) sections 482 (FIG. 10) of the lower surface 478 of the lower housing component 460*l* located between the recesses 474.

In the particular embodiment of the present disclosure illustrated, the indexing members 456 are configured as bearings (rollers) 484 (FIG. 9), which allows for rotation (revolution) of the bearings 484 during rotation of the first support 404. It should be appreciated, however, that the particular configuration of the indexing members 456 may be varied in alternate embodiments without departing from the scope of the present disclosure. For example, it is also envisioned that the indexing members 456 may include pins or other such members that are deflectable (e.g., compressible) during rotation of the first support 404 as the recesses 472, 474 are moved into and out of rotational alignment.

It is envisioned that the indexing members 456 may include any material or combination of materials suitable for the purpose of reducing wear and increasing the usable life of the indexing members 456 and the accessory 400. For example, while the indexing members 456 are illustrated as including (e.g., being formed from) one or more metallic materials in the particular embodiment shown throughout the figures, it should be appreciated that alternate materials of construction may be utilized without departing from the scope of the present disclosure. Additionally, in certain embodiments, it is envisioned that a lubricant (e.g., grease or the like) may be employed to reduce friction between the housing 452 and the body 402 of the accessory 400 during rotation of the first support 404. For example, it is envisioned that the lubricant may be applied as a coating to the recesses 472, 474 and/or the indexing members 456.

In the particular embodiment of the present disclosure shown throughout the figures, the body 402 of the accessory includes four recesses 472*i*-472*iv* each defining a depth Di (FIG. 7) and the housing 452 includes four recesses 474*i*-474*iv* each defining a depth Dii. As seen in FIG. 7, the recesses 472, 474 are configured such that the depth Dii exceeds the depth Di. It should be appreciated, however, that the particular depths Di, Dii respectively defined by the recesses 472, 474 may be varied without departing from the scope of the present disclosure (e.g., to alter wear on the first support 404 and/or the indexing members 456, to alter the tactile feel of the first support 404 during rotation, etc.). For example, it is envisioned that the recesses 472, 474 may be configured such that the depths Di, Dii are (approximately) equal or such that the depth Di exceeds the depth Dii.

The recesses 472, 474 are arranged such that adjacent recesses 472, 474 are separated by (approximately) 90 degrees, which allows for positioning of the first support 404 in four discrete (cardinal) rotational positions relative to the body 402 that are also (sequentially) separated by (approximately) 90 degrees. More specifically, the first support 404 is positionable in: (i) a first position, in which the recesses 472i-472iv are aligned with the recesses 474i-474iv, respectively; (ii) a second position, in which the recesses 472i, 472ii, 472iii, 472iv are aligned with the recesses 474ii, 474iii, 474iv, 474i, respectively; (iii) a third position, in which the recesses 472i, 472ii, 472iii, 472iv are aligned with the recesses 474iii, 474iv, 474i, 474ii, respectively; and (iv) a fourth position, in which the recesses 472i, 472ii, 472iii, 472iv are aligned with the recesses 474iv, 474i, 474ii, 474iii, respectively. It should be appreciated, however, that the particular number of recesses 472, 474 and indexing members 456 may be increased or decreased in alternate embodiments of the present disclosure to vary the corresponding number of discrete positions for the first support 404 as necessary or desired. As such, embodiments of the present disclosure include fewer and greater numbers of recesses 472, 474 and indexing members 456 are contemplated herein, as are embodiments in which the housing 452 and the body 402 are entirely devoid of the recesses 472 and/or the recesses 474.

The biasing member 458 is located within the cavity 468 defined by the body 402 of the accessory 400 and is positioned (axially, vertically) between the base 454 and the body 402. In the particular embodiment illustrated, the biasing member 458 is configured as a wave spring 486 that includes (e.g., is formed from) one or more metallic materials. It should be appreciated, however, that the particular configuration of the biasing member 458 may be varied in alternate embodiments without departing from the scope of the present disclosure.

The biasing member 458 is under constant compression and applies an axial force F (FIG. 7) to the first support 404 that urges (biases) the first support 404 (vertically) downward (e.g., towards the body 402) along the axis of rotation R in the direction identified by arrow 1. The axial force F not only maintains the assembly of the first support 404 and the accessory 400, but maintains positioning of the indexing members 456 within the recesses 472 defined in the upper surface 476 of the body 402. Additionally, the axial force F resists axial deflection of the first support 404 (e.g., (vertically) upward movement of the first support 404 away the body 402) along the axis of rotation R in the direction identified by the arrow 2 during rotation of the first support 404, which secures the first support 404 in each of the discrete (cardinal) rotational positions until the application of a threshold rotational force Fr (FIG. 8) to the first support 404. Upon application of the threshold rotational force Fr, the axial force F is overcome, which allows for rotation of the first support 404. The biasing member 458 (and the axial force F applied to the first support 404 thereby) thus inhibit (if not entirely prevent) unintended rotation of the first support 404 and the image capture device 100.

In certain embodiments of the present disclosure, such as that illustrated throughout the figures, it is envisioned that the biasing member 458 may be configured such that the axial force F applied to the first support 404 is sufficient to resist unintended rotation of the first support 404 when the first support 404 is located between the cardinal positions (e.g., when the indexing members 456 are in contact with the (generally planar) sections 482 (FIG. 10) of the lower surface 478 of the lower housing component 460l located between the recesses 474.

To reduce wear (e.g., friction, abrasion, etc.) on the biasing member 458 and/or the body 402 of the accessory 400, it is envisioned that the accessory 400 may include a washer 488 (FIG. 7) (or other such suitable member) positioned between the biasing member 458 and the body 402. For example, in the illustrated embodiment, a single washer 488 is provided that includes (e.g., is formed from) nylon. It should be appreciated, however, that the particular number of washers 488 and/or the material(s) used in construction of the washer 488 may be varied in alternate embodiments without departing from the scope of the present disclosure.

With continued reference to FIGS. 4-10, use of the first support 404 will be discussed. Initially, the fastener 430 (FIGS. 4, 5) is loosened (e.g., via counterclockwise rotation of the handle 440) and removed from the first support 404, which allows for insertion of the protrusions 137 on the image capture device 100 into the channels 438 defined between the protrusions 432 on the first support 404. The fastener 430 is then inserted through the openings 436 (FIG. 5), 137B (FIG. 1B) in the protrusions 432, 137, respectively, such that the operative end 448 of the shank 442 engages the internal threading 450 (FIG. 5) on the protrusion 432iii. The fastener 430 is then rotated (e.g., clockwise via the handle 440) to thereby secure the fastener 430 to the protrusion 432iii and connect the image capture device 100 and the accessory 400. Once the particular degree of tilt between the image capture device 100 and the accessory 400 is achieved, the fastener 430 can be further tightened to fix the position of the image capture device 100 via compression of the protrusions 432, 137.

During adjustment of the tilt angle, it is envisioned that the fastener 430 may be incrementally adjusted to vary the compressive force applied to the protrusions 432, 137. For example, the fastener 430 may be tightened to an initial extent and thereby apply compression sufficient to stabilize the image capture device 100 at a desired angle and allow for fine-tuning in the particular position thereof. Thereafter, once the position of the image capture device 100 has been finalized, additional compression can be applied to the protrusions 432, 137 by further tightening the fastener 430 so as to inhibit (if not entirely prevent) unintended variation in the tilt angle of the image capture device 100 during use.

During use of the accessory 400, if necessary or desired, the rotational position of the image capture device 100 can be varied by rotating the first support 404 via the (manual) application of force to the image capture device 100 or the first support 404 (e.g., via the handle fastener 430). As the applied rotational force is increased, the first support 404 begins to rotate as the recesses 474 (FIGS. 7, 10) in the housing 452 traverse the indexing members 456. Upon reaching the threshold rotational force Fr, the first support 404 is deflected (axially, vertically) upward (e.g., away from the body 402 of the accessory 400) in the direction indicated by arrow 2 (FIG. 7), which reduces (closes) the gap 470 and increases compression of the biasing member 458 and, thus, the axial force F. Rotation of the first support 404 continues until the indexing members 456 are removed from the recesses 474 and are positioned therebetween (e.g., such that the indexing members 456 engage (contact) the (generally planar) sections 482 (FIG. 10)), at which point, axial deflection of the first support 404 is at a maximum and the gap 470 is at an operational minimum. For example, in certain embodiments, it is envisioned that the base 454 (e.g., the platform 464) and the body 402 of the accessory 400 may be configured such that the gap 470 is entirely closed at the point of maximum axial deflection of the first support 404 (e.g., via contact between the base 454 (FIG. 7) (e.g., the platform 464) and the body 402 of the accessory 400).

Continued rotation of the image capture device 100 and the first support 404 realigns the recesses 474 and the indexing members 456, at which point, the axial force F applied by the biasing member 458 urges the first support 404 (axially, vertically) downward (e.g., towards the body 402 of the accessory 400) in the direction indicated by arrow 1 (FIG. 7). As the indexing members 456 re-enter the recesses 474, the gap 470 is restored to an operation maximum and compression on the biasing member 458 is alleviated. As compression on the biasing member 458 is alleviated, the axial force F is reduced, which provides the user with a tactile indication that the first support 404 is secured within one of the discrete (cardinal) positions. In certain embodiments of the present disclosure, it is envisioned that the accessory 400 may also provide the user with an audible indication that the first support 404 and the image capture device 100 are rotationally secured as the first support 404 "clicks" through the discrete cardinal positions (e.g., depending on the materials of construction utilized, the particular configuration of the biasing member 458 and the magnitude of the axial force F applied thereby, etc.).

Figure 13:
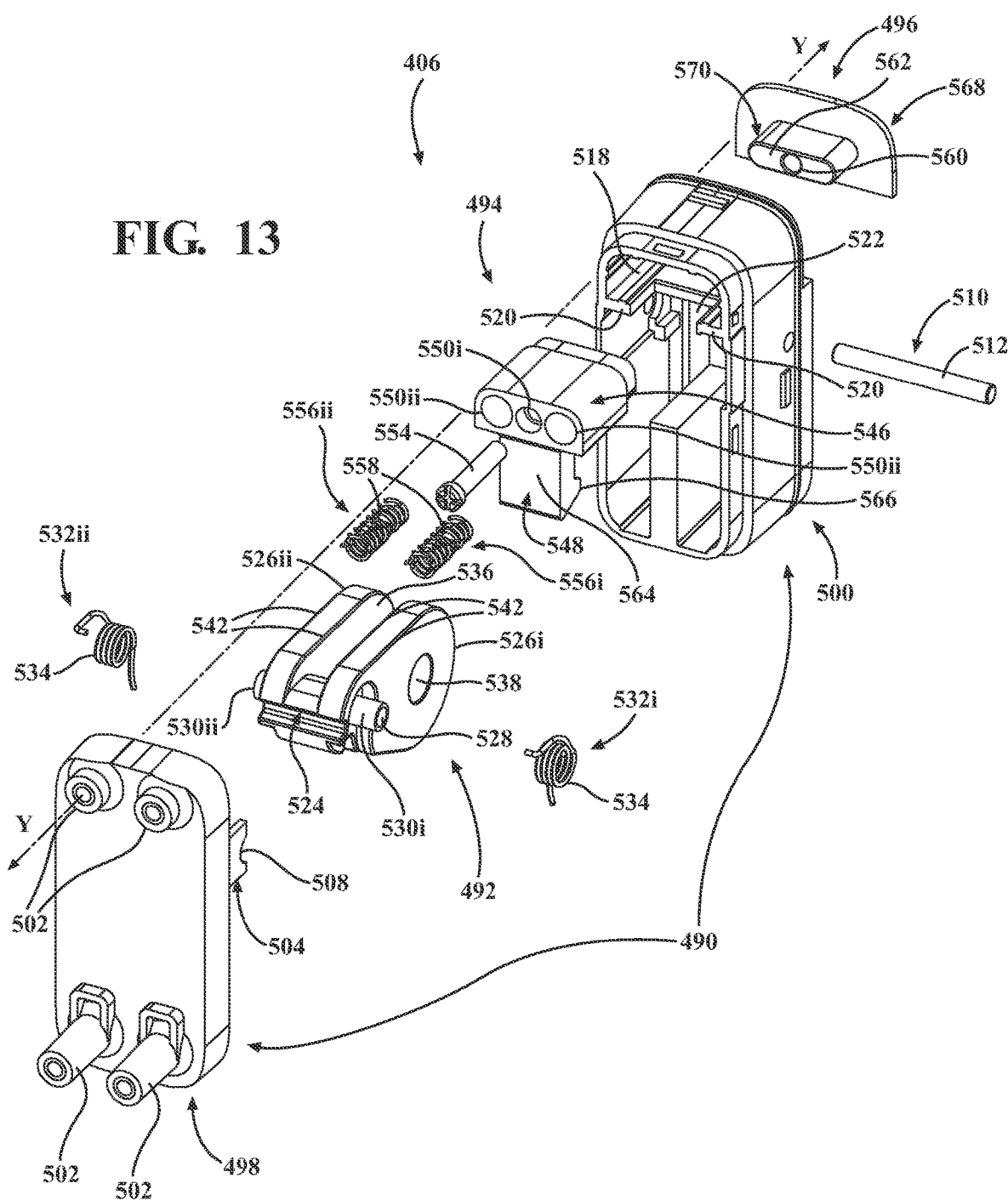
FIG. 13 is a front, perspective view of the second support shown removed from the accessory and with parts separated.
Figure 14:
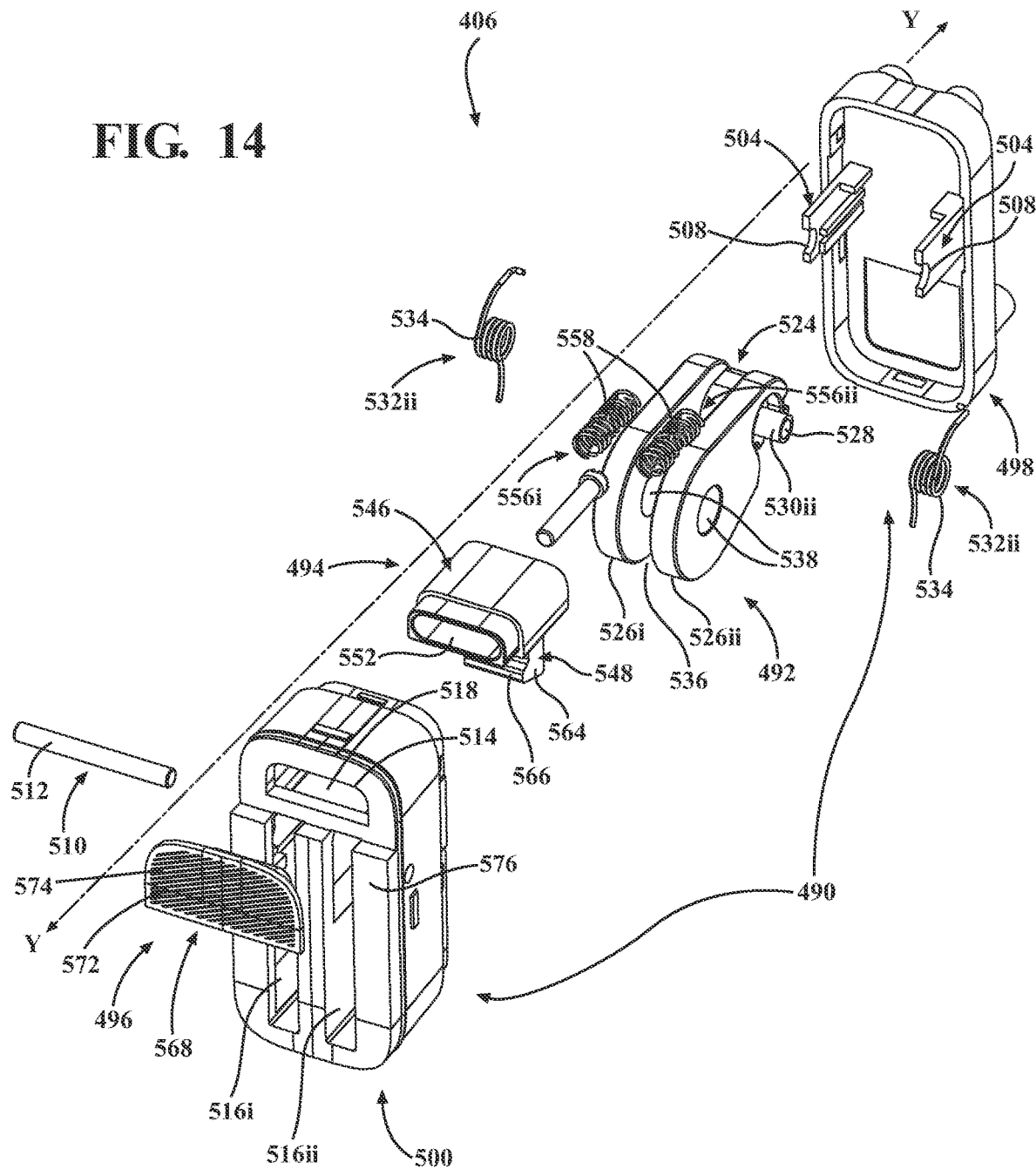
FIG. 14 is a rear, perspective view of the second support shown removed from the accessory and with parts separated.
Figure 15:
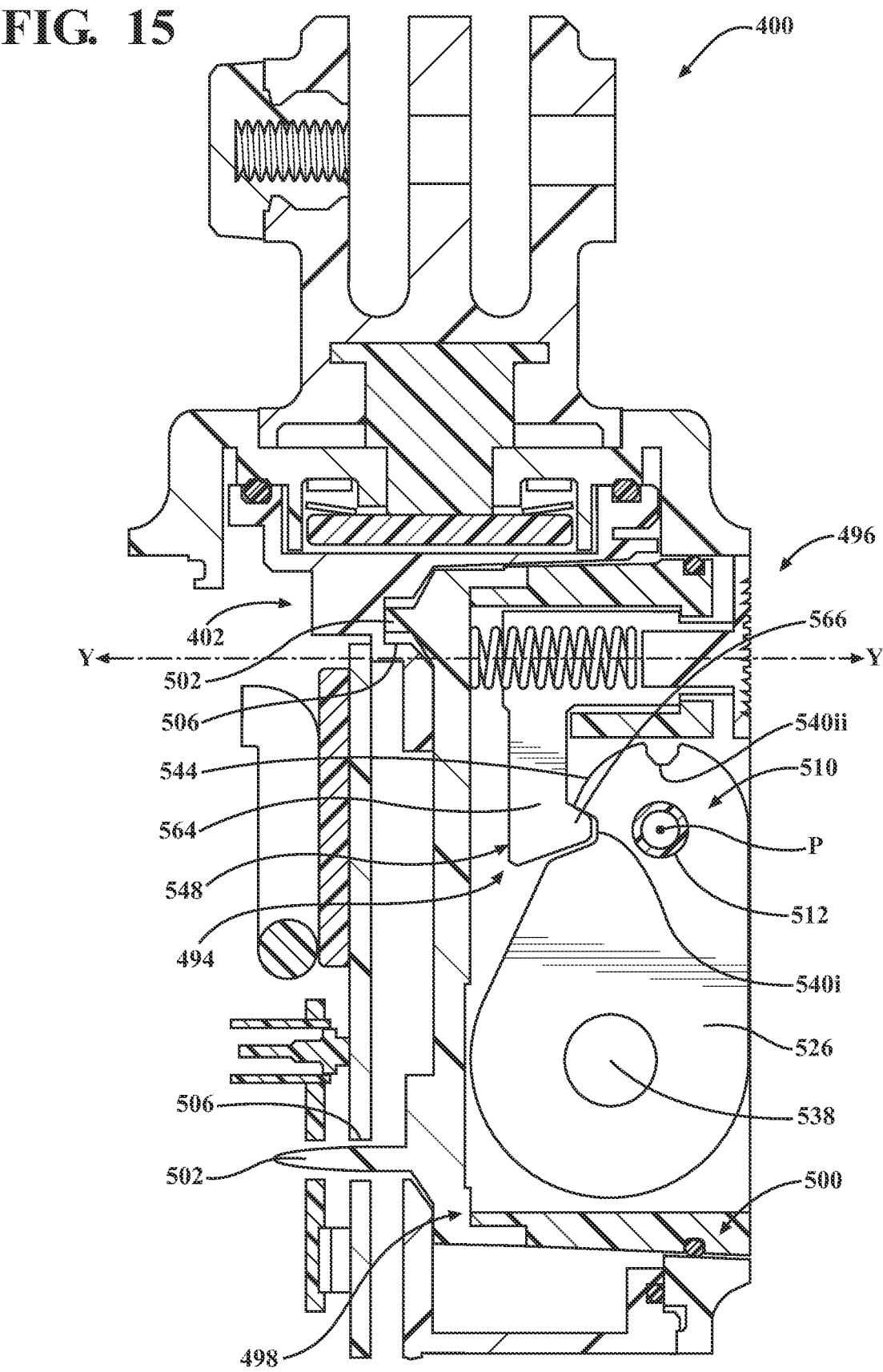
FIG. 15 is a partial, longitudinal (vertical) cross-sectional view of the accessory with the second support shown in the stowed configuration.
Figure 16:
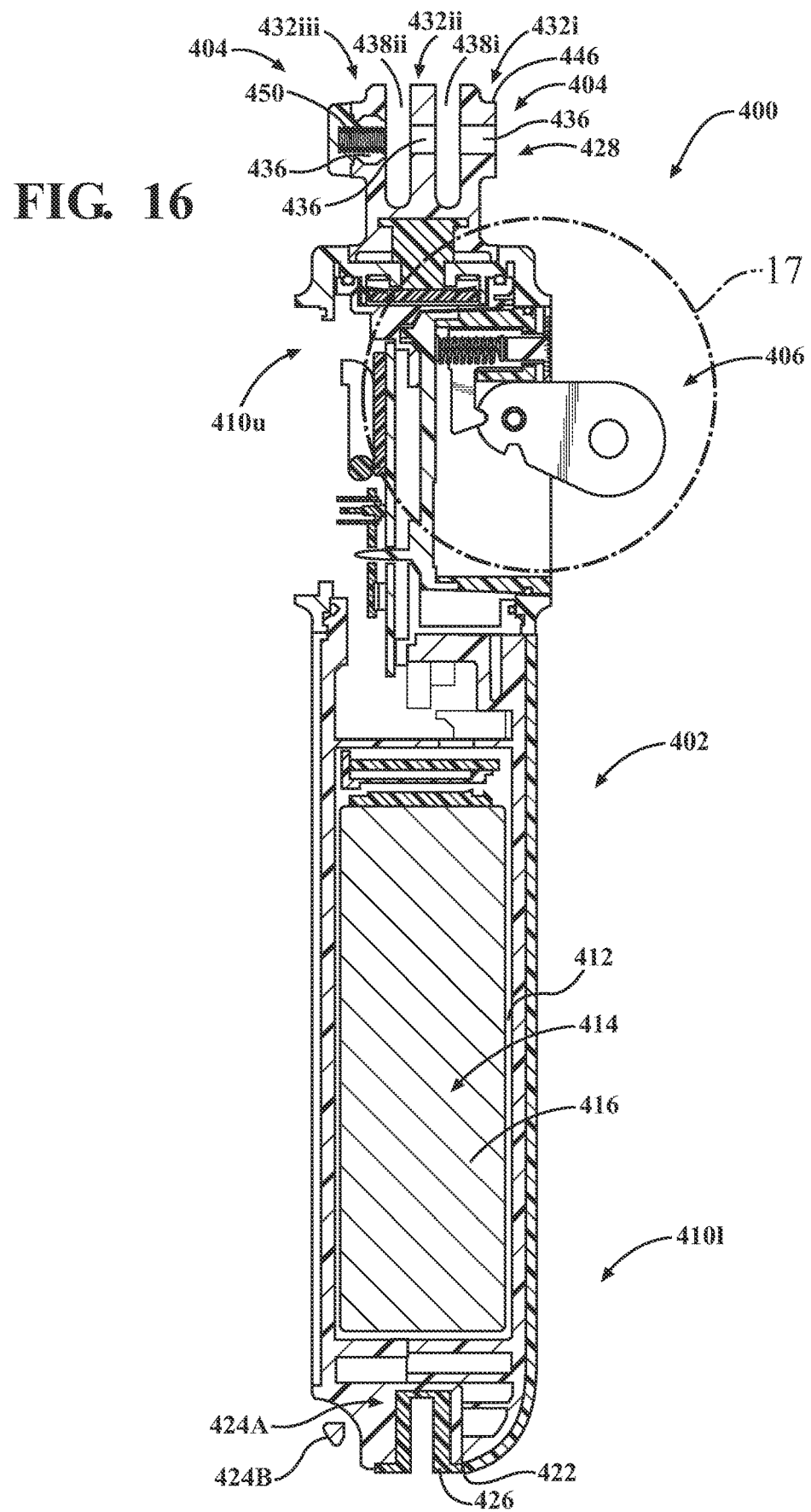
FIG. 16 is a longitudinal (vertical) cross-sectional view of the accessory with the second support shown in the deployed configuration.
Figure 17:
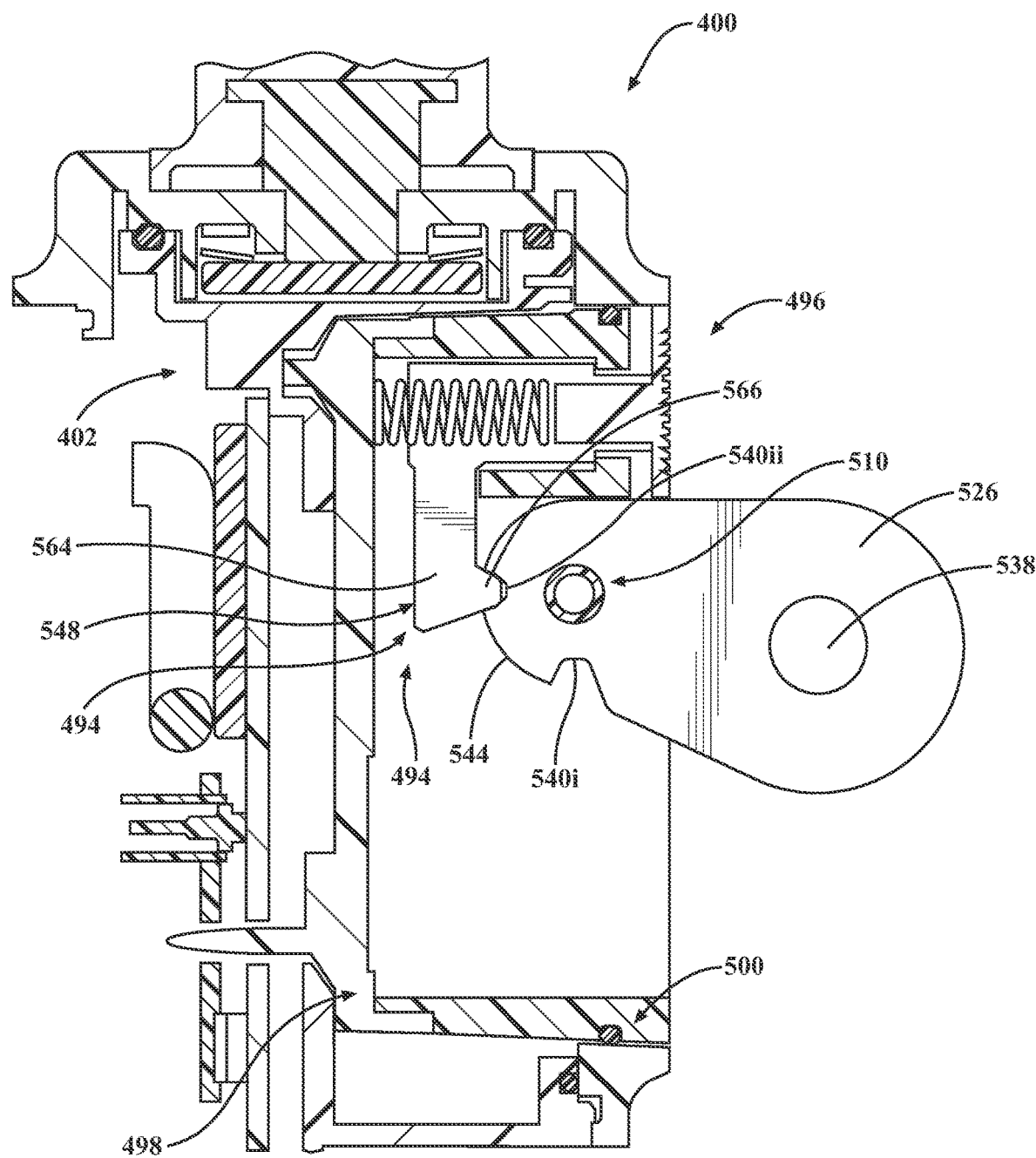
FIG. 17 is an enlargement of the corresponding area of detail identified in FIG. 16.
Figure 18:
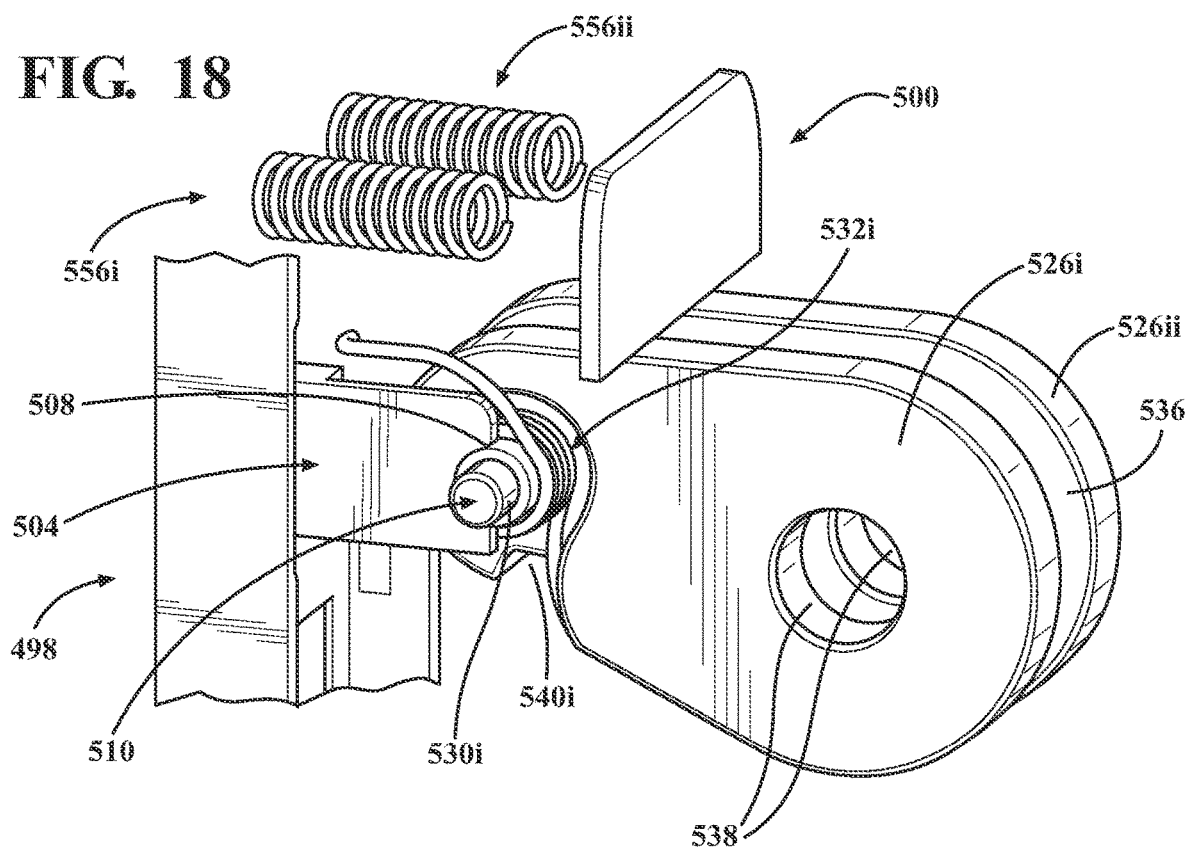
FIG. 18 is a partial, side, perspective view of the second support shown in the deployed configuration.

With reference now to FIGS. 11-18, the second support 406 will be discussed. More specifically, FIG. 11 provides a partial, side, perspective view of the accessory 400 with the second support 406 shown in a stowed (first, initial) configuration; FIG. 12 provides a partial, side, perspective view of the accessory 400 with the second support 406 shown in a deployed (second, subsequent) configuration; FIG. 13 provides a front, perspective view of the second support 406 shown removed from the accessory 400 and with parts separated; FIG. 14 provides a rear, perspective view of the second support 406 shown removed from the accessory 400 and with parts separated; FIG. 15 provides a partial, longitudinal (vertical) cross-sectional view of the accessory 400 with the second support 406 shown in the stowed configuration; FIG. 16 provides a longitudinal (vertical) cross-sectional view of the accessory 400 with the second support 406 shown in the deployed configuration; FIG. 17 provides an enlargement of the corresponding area of detail identified in FIG. 16; and FIG. 18 provides a partial, side, perspective view of the second support 406 shown in the deployed configuration. As discussed in detail below, the second support 406 includes: a housing assembly 490 (FIGS. 13, 14); a (second) engagement member 492; a locking mechanism 494 (FIGS. 13, 14); and an actuation member 496.

The housing assembly 490 includes respective front and rear (first and second) housing components 498, 500 that are configured to receive (accommodate) the remaining components of the second support 406 (e.g., the engagement member 492, the locking mechanism 494, and the actuation member 496). It is envisioned that the housing components 498, 500 may be configured for connection in any suitable manner. For example, it is envisioned that the housing components 498, 500 may be fixedly connected via an adhesive, via sonic welding, etc. Alternatively, it is envisioned that the housing components 498, 500 may be releasably connected (e.g., to allow for disassembly of the housing assembly 490, maintenance and/or replacement of one or more internal components, etc.). For example, it is envisioned that the housing components 498, 500 may be releasably connected via one or more mechanical fasteners (e.g., screws, pins, etc.), via corresponding protrusions (e.g., detents) and recesses, etc.

The front housing component 498 includes (a set, series, plurality of) external contact members 502 (FIGS. 13, 15) (e.g., protrusions, detents, ribs, etc.) that extend forwardly therefrom (e.g., away from the rear housing component 500) and a pair of braces 504 that extend rearwardly therefrom (e.g., towards the rear housing component 500). The external contact members 502 are configured for engagement (contact) with corresponding internal contact members 506 (FIG. 15) (e.g., recesses, openings, etc.) defined by the body 402 of the accessory 400, thereby connecting the housing assembly 490 to the body 402 of the accessory 400. The braces 504 define arcuate reliefs 508 (FIG. 14) that are configured for engagement (contact) with a pivot member 510 (e.g., a pin 512 or the like) that extends through the engagement member 492 to support movement of the engagement member 492 during reconfiguration of the second support 406 between the stowed and deployed configurations. More specifically, the pivot member 510 facilitates pivoting of the engagement member 492 about a pivot axis P (FIG. 15) that extends through the pivot member 510 in transverse (e.g., (generally) orthogonal) relation to the longitudinal axis X (FIGS. 4, 5) and the axis of rotation R (FIGS. 7, 8).

Engagement (contact) between the braces 504 and the pivot member 510 not only facilitates movement of the first support 404 between the stowed configuration (FIGS. 11, 15) and the deployed configuration (FIGS. 12, 16-18), as discussed in further detail below, but stabilizes the engagement member 492 within the housing assembly 490. More specifically, it is envisioned that the braces 504 and the pivot member 510 may be configured to inhibit (if not entirely prevent) relative lateral movement therebetween (e.g., movement along the pivot axis P).

The rear housing component 500 defines a window 514 (FIG. 14) that is configured to receive (accommodate) the actuation member 496 and (a set, series, plurality of) openings 516 that accommodate movement of the engagement member 492 during reconfiguration of the second support 406 between the stowed and deployed configurations, as discussed in further detail below.

The window 514 communicates within an internal chamber 518 (FIG. 13) defined by the rear housing component 500. The internal chamber 518 is configured to receive the locking mechanism 494 such that the locking mechanism 494 is movable therein between a locked position, in which the locking mechanism 494 engages (contacts) the engagement member 492 to maintain the configuration of the second support 406 (whether stowed or deployed), and an unlocked position, in which the locking mechanism 494 is disengaged (separated, spaced) from the engagement member 492 to allow for reconfiguration of the second support 406 between the stowed and deployed configurations, as discussed in further detail below. More specifically, the window 514 includes a pair of rails 520 that extend towards the front housing component 498 so as to define a (generally) U-shaped recess 522. The rails 520 are configured to slidably support the locking mechanism 494 during movement between the locked and unlocked positions, during which, the locking mechanism 494 moves within the U-shaped recess 522 along an axis Y (FIGS. 13-15) that extends in (generally) orthogonal relation to the longitudinal axis X (FIGS. 4, 5) and the axis of rotation R (FIGS. 7, 8).

The engagement member 492 is configured for engagement with (connection to) an ancillary product (accessory) AP (FIG. 5), such as, for example, a wrist strap, a vest, a hat, a helmet, a surfboard, the handlebars of a motorcycle, etc. More specifically, the engagement member 492 is configured for connection to a mounting structure M on the ancillary product (accessory) AP, which includes a configuration corresponding to that of the engagement member 492 such that the accessory 400 and, thus, the image capture device 100, are connectable to the ancillary product (accessory) AP via connection of the engagement member 492 and the mounting structure M, as discussed in further detail below.

The engagement member 492 includes a spine 524 (FIGS. 13, 14) and (a second set, series, plurality of) protrusions 526 that are connected to, and which extend from, the spine 524 such that the spine 524 and the protrusions 526 move in unison during reconfiguration of the second support 406 between the stowed and deployed configurations. As seen in FIG. 11, in the stowed configuration, the protrusions 526 are concealed within the body 402 of the accessory 400 (e.g., within the housing assembly 490). By contrast, as seen in FIG. 12, in the deployed configuration, the protrusions 526 are exposed and extend laterally outward from the body 402 of the accessory 400. More specifically, the protrusions 526 extend through the openings 516 in the rear housing component 500 in transverse (e.g., (generally) orthogonal) relation to the protrusions 432 (FIG. 5) on the first support 404.

In the particular embodiment illustrated, the engagement member 492 is integrally formed (e.g., the spine 524 and the protrusions 526 are unitarily (monolithically) formed from a single piece of material). It is also envisioned, however, that the engagement member 492 (e.g., the spine 524 and/or the protrusions 526) may be formed as discrete members that may be connected together in any suitable manner (e.g., via one or more mechanical fasteners, via an adhesive, via ultrasonic welding, etc.).

The spine 524 defines a channel 528 that is configured to receive the pivot member 510 and extends laterally outward from the protrusions 526 so as to define one or more supports 530 for one or more biasing members 532 (e.g., torsion springs 534). The pivot member 510 extends through the spine 524 so as to facilitate engagement (contact) with the arcuate reliefs 508 defined by the braces 504 on the front housing component 498, thereby rendering the engagement member 492 captive to the accessory 400 (e.g., such that the protrusions 526 are fixedly connected to the accessory 400 and are non-removable therefrom).

The biasing member(s) 532 are positioned about the support(s) 530 and are configured for engagement (contact) with the engagement member 492 (e.g., the protrusions 526) to bias the second support 406 towards the deployed configuration. For example, it is envisioned that the biasing member(s) 532 may be configured and/or positioned to act upon the front housing component 498, the spine 524, the protrusions 526, and/or the braces 504 (e.g., depending on spatial requirements, the particular materials utilized in construction of the accessory 400, etc.). While the particular specifications of the biasing member(s) 532 may be altered in various embodiments of the present disclosure, it is envisioned that the biasing force applied thereby should be of sufficient magnitude to ensure movement of the second support 406 into the deployed configuration in the presence of dirt, debris, etc. (e.g., within the housing assembly 490).

Although the accessory 400 is illustrated as including a pair of supports 530*i*, 530*ii* and biasing members 532*i*, 532*ii* in the particular embodiment illustrated throughout the figures, it should be appreciated that the particular number of supports 530 and biasing members 532 may be varied in alternate embodiments without departing from the scope of the present disclosure. For example, an embodiment of the accessory 400 including a single support 530 and a single biasing member 532 also envisioned herein, as are embodiments including three or more biasing members 532.

The protrusions 526 define a channel 536 therebetween and each include an opening 538 and a pair of (e.g., first and second) locking detents 540*i*, 540*ii* (FIGS. 15, 17, 18). The channel 536 and the openings 538 are configured for engagement with (connection to) the mounting structure M (FIG. 5) provided on the ancillary product (accessory) AP in a manner that is substantially similar (if not identical) to that discussed above in connection with the protrusions 432, 137 respectively included on the first support 404 and the image capture device 100.

In the illustrated embodiment, the accessory 400 is illustrated as including a pair of protrusions 526*i*, 526*ii* defining a single channel 536 therebetween, which are movable into and out of the corresponding openings 516*i*, 516*ii* (FIGS. 12, 14) in the rear housing component 500. It should be appreciated, however, that the particular number of protrusions 526 and openings 516 may be varied in alternate embodiments without departing from the scope of the present disclosure. For example, an embodiment of the accessory 400 including a single protrusion 526 and a single opening 516 is also envisioned herein, as are embodiments including three or more protrusions 526 and openings 516.

To increase user comfort, it is envisioned that the protrusions 526 may include radiused (non-linear, arcuate) outer edges 542 (FIG. 13). For example, it is envisioned that the outer edges 542 may define a radius that lies substantially within the range of (approximately) 0.1 mm to (approximately) 0.2 mm (e.g., to balance the surface area available for contact with user feel).

The locking detents 540*i*, 540*ii* are configured for engagement (contact) with the locking mechanism 494 to maintain the second support 406 in the stowed and deployed configurations. More specifically, the locking detents 540*i* are configured for secured engagement (contact) with the locking mechanism 494 in the stowed configuration, as seen in FIG. 15, so as to inhibit (if not entirely prevent) unintended movement of the second support 406 into the deployed configuration and the locking detents 540*ii* are configured for secured engagement (contact) with the locking mechanism 494 in the deployed configuration, as seen in FIG. 17, so as to inhibit (if not entirely prevent) unintended movement of the second support 406 into the stowed configuration. To facilitate such engagement (contact) between the locking detents 540*i*, 540*ii* and the locking mechanism 494, the locking detents 540*i*, 540*ii* are offset from each other by (approximately) 90 degrees along outer (peripheral) surfaces 544 (FIGS. 15, 17) of the protrusions 526. Embodiments devoid of one or more of the locking detents 540, however, would not be beyond the scope of the present disclosure. For example, in one particular embodiment, it is envisioned that the locking detents 540*ii* may be omitted.

The locking mechanism 494 includes a head portion 546 (FIGS. 13, 14) and a locking member 548 that extends therefrom. In the particular embodiment illustrated, the head portion 546 and the locking member 548 are illustrated as being integrally (e.g., unitarily, monolithically) formed from a single piece of material. It is also envisioned, however, that the head portion 546 and the locking member 548 may be formed as discrete members that may be connected together in any suitable manner (e.g., via one or more mechanical fasteners, via an adhesive, via ultrasonic welding, etc.).

The head portion 546 defines (a set, series, plurality of) channels 550 (FIG. 13) and a cavity 552 (FIG. 14). More specifically, the head portion 546 includes a (first) channel 550*i* that is configured to receive a rod 554 and a pair of (second) channels 550*ii* that are configured to receive corresponding biasing members 556 (e.g., compressions springs 558). Although illustrated as including a pair of channels 550*i*, 550*ii* and pair of biasing members 556*i*, 556*ii* in the embodiment illustrated throughout the figures, it should be appreciated that the particular number of channels 550 and biasing members 556 may be varied in alternate embodiments without departing from the scope of the present disclosure. For example, an embodiment of the accessory 400 in which the head portion 546 includes a single channel 550 that is configured to receive a single biasing member 556 is also envisioned herein, as are embodiments including three or more channels 550 and biasing members 556.

The rod 554 extends through the channel 550i and is configured for engagement with (connection to) the actuation member 496 such that the actuation member 496 and locking mechanism 494 move in unison upon the (manual) application of force to the actuation member 496, as discussed in further detail below. More specifically, the rod 554 is configured for receipt within a corresponding depression 560 (FIG. 13) defined on an inner surface 562 of the actuation member 496, which facilitates proper alignment and engagement of (contact between) the locking mechanism 494 and the actuation member 496.

The biasing member(s) 556 are received within the channels 550ii such that the biasing member(s) 556 are secured between the locking mechanism 494 and the front housing component 498. More specifically, the second support 406 is configured such that the biasing member(s) 556 are under constant compression, whereby the locking mechanism 494 is biased towards the locked position and into engagement with the engagement member 492 (e.g., the protrusions 526).

The locking member 548 includes an arm 564 that extends axially (e.g., vertically) from the head portion 546 and a tooth 566 that extends laterally from the arm 564 (e.g., in (generally) parallel relation to the axis Y along which the locking mechanism 494 moves during repositioning between the locked and unlocked positions). The tooth 566 is configured for engagement (contact) with the locking detents 540i, 540ii defined by the protrusions 526. More specifically, when the second support 406 is in the stowed configuration, the tooth 566 is received by the locking detents 540i, as seen in FIG. 15, and when the second support 406 is in the deployed configuration, the tooth 566 is received by the locking detents 540ii, as seen in FIG. 17. The tooth 566 and the locking detents 540i, 540ii include corresponding configurations and are configured to resist any (unintentional) application of external force to the engagement member 492 (e.g., the protrusions 526) that may otherwise result in movement of the engagement member 492, thus inhibiting (if not entirely preventing) unintended reconfiguration of the second support 406 from the deployed configuration to the stowed configuration.

The actuation member 496 is located vertically above the engagement member 492 and the openings 516 in the rear housing component 500, and includes a tactile member 568 (FIGS. 13, 14) and a stem 570 (FIG. 13) that extends (forwardly) from the tactile member 568 (e.g., towards the front housing component 498). Although shown as being integrally (e.g., unitarily, monolithically) formed in the illustrated embodiment, it is also envisioned that the tactile member 568 and the stem 570 may be formed as discrete members that may be connected together in any suitable manner (e.g., via one or more mechanical fasteners, via an adhesive, via ultrasonic welding, etc.).

The tactile member 568 includes an outer surface 572 that is configured for manual engagement by the user to facilitate movement of the locking mechanism 494 from the locked position to the unlocked position, as discussed in further detail below. To increase tactility and user feel, in certain embodiments, such as that illustrated throughout the figures, it is envisioned that the outer surface 572 may include texturing 574 (e.g., knurling or the like).

The stem 570 is configured for insertion into the cavity 552 defined by the head portion 546 of the locking mechanism 494 and extends through the window 514 in the rear housing component 500 such that the actuation member 496 moves (e.g., slides transversely) within the window 514 during actuation (e.g., along the axis Y). In alternate embodiments of the present disclosure, however, it is envisioned that the actuation member 496 may be instead configured for axial (e.g., vertical, longitudinal) movement, pivotable movement, rotational movement, etc.

As seen in FIG. 14, the window 514 is recessed into an outer (rear) surface 576 of the rear housing component 500. Recessing of the window 514 not only defines a range of movement for the tactile member 568, but allows the tactile member 568 to sit (generally) flush with the outer surface 576 of the rear housing component 500 in the absence of any (manually) applied external force, thereby improving the overall aesthetic appearance of the accessory 400.

The stem 570 includes the aforementioned depression 560, which is defined on the inner surface 562 thereof, so as to facilitate engagement of (contact between) the locking mechanism 494 and the actuation member 496 via the rod 554, which extends through the head portion 546. Upon the (manual) application of force to the tactile member 568, the stem 570 moves within the window 514 and into the internal chamber 518 defined by the rear housing component 500 and, thus, the body 402 of the accessory 400. Movement of the actuation member 496 results in corresponding movement of the locking mechanism 494 from the locked position to the unlocked position by virtue of the connection therebetween established by the rod 554. In certain embodiments of the present disclosure, it is envisioned that the stem 570 may be connected to the head portion 546 of the locking mechanism 494 (e.g., via one or more mechanical fasteners, via an adhesive, via ultrasonic welding, etc.) to further ensure concomitant movement of the actuation member 496 and the locking member 548.

With continued reference to FIGS. 11-18, use of the second support 406 will be discussed. When connection of the accessory 400 and the image capture device 100 to the ancillary product (accessory) AP (FIG. 5) is necessary or desired, the user (manually) depresses the actuation member 496 to actuate the second support 406. Upon actuation, the stem 570 (FIG. 13) is displaced inwardly and moves within the window 514 (FIG. 14), which causes corresponding movement of the locking mechanism 494 from the locked position to the unlocked position. As the locking mechanism 494 moves from the locked position to the unlocked position, compression on the biasing member(s) 556 is increased as the tooth 566 is removed from the locking detents 540i (FIG. 15) defined by the protrusions 526. Upon removal of the tooth 566 from the locking detents 540i, the second support 406 is automatically reconfigured from the stowed configuration stowed configuration (FIGS. 11, 15) into the deployed configuration (FIGS. 12, 16-18) by virtue of the force applied by the biasing member(s) 532 (FIGS. 13, 14), during which, the engagement member 492 pivots about the pivot axis P (FIG. 15) defined by the pivot member 510 extending through the spine 524, which causes movement of the protrusions 526 through the openings 516 (FIGS. 12, 14) in the rear housing component 500.

Following release of the actuation mechanism 496, the locking mechanism 494 is automatically returned to the locked position by virtue of the biasing force applied by (and the increased compression in) the biasing member(s) 556, which causes insertion of the tooth 566 into the locking detents 540ii (FIG. 17) defined by the protrusions 526, thereby maintaining the second support 406 in the deployed configuration. The accessory 400 can then be connected to the ancillary product (accessory) AP (FIG. 5) in the manner discussed above, which allows for either hand-held or hands-free utilization of the accessory 400 and the image capture device 100 in a wearable use case.

Following use of the ancillary product (accessory) AP, the engagement member 492 can be separated therefrom and the second support 406 can be returned to the stowed configuration. More specifically, the user again (manually) depresses the tactile member 568, which results in movement of the locking mechanism 494 from the locked position to the unlocked position, thereby removing the tooth 566 from the locking detents 540ii (FIG. 17). Upon removal of the tooth 566 from the locking detents 540ii, the user (manually) applies a force to the engagement member 492 such that the engagement member 492 pivots inwardly towards the body 402 of the accessory 400, thereby re-inserting the protrusions 526 into the openings 516 (FIGS. 12, 14) in the rear housing component 500 and increasing the biasing force in the biasing member(s) 532.

The tactile member 568 can then be released, which allows the locking mechanism 494 to automatically return to the locked position under by virtue of the biasing force applied by (and the increased compression in) the biasing member(s) 556, which causes re-insertion of the tooth 566 into the locking detents 540i (FIG. 15), thereby maintaining the second support 406 in the stowed configuration.

Figure 19:
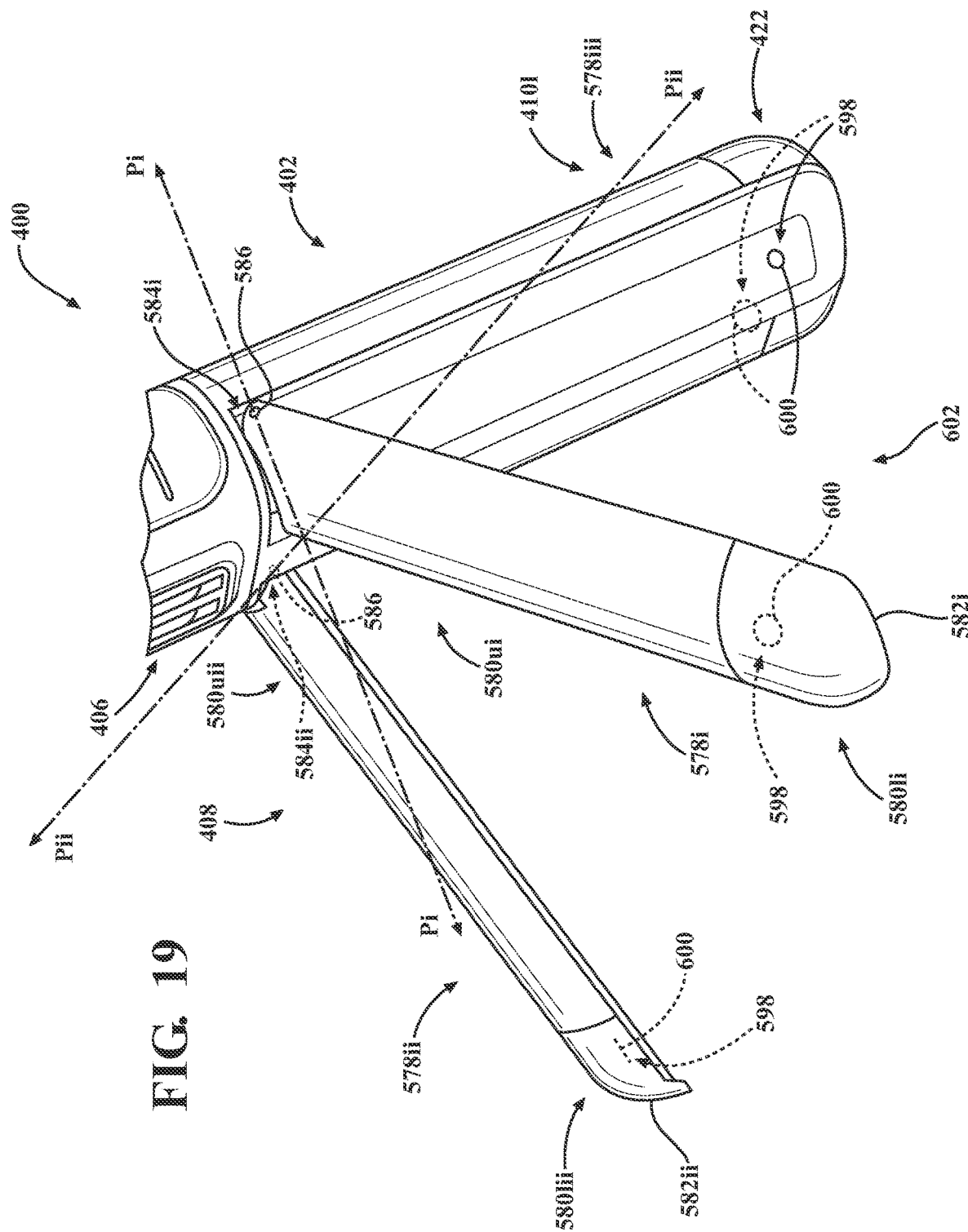
FIG. 19 is a partial, side, perspective view of the accessory illustrating a third support shown in an expanded configuration.

With reference now to FIGS. 4A, 6, and 19, the third support 408 will be discussed. More specifically, FIG. 4A provides a front, perspective view of the accessory 400, as indicated above; FIG. 6 provides a transverse (horizontal) cross-sectional view of the accessory 400 with the third support 408 shown in a collapsed (closed) configuration; and FIG. 19 provides a partial, side, perspective view of the accessory 400 with the third support 408 shown in an expanded (open) configuration.

The third support 408 is located at (supported by) the lower end 410l of the body 402 and includes respective first and second legs 578i, 578ii. The legs 578i, 578ii are (generally) identical in configuration and are pivotably connected to the body 402, which allows for reconfiguration of the third support 408 between the collapsed configuration and the expanded configuration. As discussed in further detail below, the legs 578i, 578ii are configured for mating engagement with the body 402 such that, when the third support 408 is in the collapsed configuration, the accessory 400 defines a (generally) ovate transverse (horizontal) cross-sectional configuration and, more specifically, a (generally) pill-shaped or stadium configuration.

The first leg 578i includes a (first) upper end 580ui that is pivotable in relation to the body 402 and an opposite (second) lower end 580li defining a foot portion 582i that is configured to support the first leg 578i on a surface. More specifically, the first leg 578i is connected to the body 402 by a (first) pivot member 584i (e.g., a pin 586 or the like) such that the first leg 578i is pivotable about a pivot axis Pi that extends in transverse (non-parallel) relation to both the axis of rotation R (FIGS. 7, 8) defined by the first support 404 and the pivot axis P (FIG. 15) defined by the second support 406.

As seen in FIG. 6, the first leg 578i defines a non-polygonal transverse (horizontal) cross-sectional configuration that includes: an outer wall 588i with an arcuate configuration defining an arc length Aiii that spans (approximately) 90 degrees; respective first and second (generally) linear segments 590ai, 590bi that extend inwardly from the outer wall 588i in (generally) orthogonal relation thereto; a third (generally) linear segment 590ci that extends from the second linear segment 590bi; a fourth (generally) linear segment 590di that extends from the first linear segment 590ai; and a fifth non-linear (arcuate) segment 590ei that extends between the segments 590ci, 590di.

The second leg 578ii includes a (first) upper end 580uii that is pivotable in relation to the body 402 and an opposite (second) lower end 580lii defining a foot portion 582ii that is configured to support the second leg 578ii on a surface. More specifically, the second leg 578ii is connected to the body 402 by a (second) pivot member 584ii (e.g., a pin 586 or the like) such that the second leg 578ii is pivotable about a pivot axis Pii that extends in transverse (non-parallel) relation to the axis of rotation R (FIGS. 7, 8) defined by the first support 404 and the pivot axis P (FIG. 15) defined by the second support 406. As seen in FIG. 19, the legs 578i, 578ii are configured and are connected to the body 402 such that the pivot axes Pi, Pii intersect.

With reference again to FIG. 6, the second leg 578ii defines a non-polygonal transverse (horizontal) cross-sectional configuration that includes: an outer wall 588ii with an arcuate configuration defining an arc length Aiv that spans (approximately) 90 degrees; respective first and second (generally) linear segments 590aii, 590bii that extend inwardly from the outer wall 588ii in (generally) orthogonal relation thereto; a third (generally) linear segment 590cii that extends from the second linear segment 590bii; a fourth (generally) linear segment 590dii that extends from the first linear segment 590aii; and a fifth non-linear (arcuate) segment 590eii that extends between the segments 590cii, 590dii.

It is envisioned that the legs 578i, 578ii may respectively engage the pivot members 584i, 584ii (FIG. 19) so as to create a frictional (interference) force therebetween sufficient to resist unintended movement of the legs 578i, 578ii when the third support 408 is in the expanded configuration, thereby securely maintaining the legs 578i, 578ii in any free position.

In the particular embodiment illustrated, the legs 578i, 578ii and the body 402 are configured such that each of the legs 578i, 578ii is pivotable through a range of motion that lies substantially within the range of (approximately) 60 degrees to (approximately) 80 degrees. It should be appreciated, however, that the particular configurations of the leg 578i, the leg 578ii, and/or the body 402 may be varied in alternate embodiments of the present disclosure to achieve any necessary or desired range of motion. As such, ranges of motion for the legs 578i, 578ii that lie outside the disclosed range are also contemplated herein.

When the third support 408 is in the collapsed (closed) configuration (FIGS. 4A, 6), the legs 578i, 578ii are positioned in (generally) adjacent relation to (e.g., are in contact with) the lower end 410l of the body 402 such that the legs 578i, 578ii and the body 402 collectively define a grip (handle) 592 (FIG. 4A), which allows for hand-held use of the image capture device 100 as well as wearability of the accessory 400, as discussed in further detail below. More specifically, when the third support 408 is in the collapsed (closed) configuration, the legs 578i, 578ii each extend in (generally) parallel relation to each other, the body 402, the longitudinal axis X (FIGS. 4A, 5), and the axis of rotation R (FIGS. 7, 8). Due to the mating configurations of the legs 578*i*, 578*ii* and the body 402, when the second support 406 is in the stowed configuration and the third support 408 is in the collapsed configuration, the body 402 includes a (first) pair of opposing surfaces each having a (generally) planar (flat) configuration, and a (second) pair of opposing surfaces, each having a non-planar configuration, which collectively define the aforementioned (generally) ovate transverse (horizontal) cross-sectional configuration. More specifically, with reference to FIGS. 4A and 6, when the third support 408 is in the closed configuration, the accessory 400 defines: a (generally) planar (flat) forward surface 594*f*; a (generally) planar (flat) rear surface 594*r* that is positioned in (generally) diametrical opposition to the forward surface 594*f*; and non-planar (e.g., arcuate) lateral surfaces 596*li*, 596*lii*, which connect the respective forward and rear surfaces 594*f*, 594*r* and are positioned in (generally) diametrical opposition.

With reference to FIGS. 4A and 19, the second support 406 and the third support 408 (e.g., the legs 578*i*, 578*ii*) are oriented along a common surface of the body 402 (e.g., the rear surface 594*r*) and, thus, face in a common (e.g., rearward) direction. Orientation of the supports 406, 408 along the rear surface 594*r* further inhibits (if not entirely prevents) inadvertent deployment of the second support 406 when the accessory 400 is used in conjunction with the ancillary product (accessory) AP (FIG. 5) (e.g., via positioning of the rear surface 594*r* and the second support 406 against the ancillary product (accessory) AP, the user's body, etc.).

In certain embodiments of the present disclosure, it is envisioned that accessory 400 may include a retention mechanism 598 (FIG. 19) to facilitate proper registration of the legs 578*i*, 578*ii*, thus enhancing stability of the accessory 400 such that the grip 592 (FIG. 4A) has the tactile feel of a solid (e.g., unitary) component and inhibiting (if not entirely preventing) unintended relative movement of the legs 578*i*, 578*ii* in relation to the body 402 when the third support 408 is in the collapsed configuration (e.g., rattling of the legs 578*i*, 578*ii*, expansion of the third support 408, etc.). Although illustrated as being located adjacent to (e.g., supported by) the foot portions 582*i*, 582*ii*, 422, it should be appreciated that the retention mechanism 598 may be located in any suitable position.

In the particular embodiment illustrated, the legs 578*i*, 578*ii* and the lower end 410*l* of the body 402 include one or more corresponding alignment members 600. It is envisioned that the alignment members 600 may be configured for mechanical engagement (e.g., the alignment members 600 may include corresponding detents and recesses that are configured for engagement in snap-fit relation). Additionally, or alternatively, it is envisioned that the alignment members 600 may include one or more magnets (or magnetic materials).

When the third support 408 is in the expanded (open) configuration (FIG. 19), the leg 578*i*, the leg 578*ii*, and the lower end 410*l* of the body 402 are spaced (separated) from each other. When so positioned, the lower end 410*l* of the body 402 defines a (third) leg 578*iii*, which at least partially receives (accommodates) the power supply 414 (FIG. 6) and cooperates with the legs 578*i*, 578*ii* to define a freestanding base 602 (e.g., a stand, tripod) such that the accessory 400 and, thus, the image capture device 100, are supported on a surface by the foot portions 582*i*, 582*ii*, 422 respectively defined by the leg 578*i*, the leg 578*ii*, and the lower end 410*l* of the body 402 (e.g., the leg 578*iii*), which allows for stationary, hands-free use of the accessory 400 and the image capture device 100. The third support 408, thus, serves dual purposes in that the third support 408 functions both as the grip 592 (when in the collapsed configuration) and as the freestanding base 602 (when in the expanded configuration).

With reference again to FIG. 4A, in addition to the aforedescribed functionality, the accessory 400 includes an electrical interface 604 and a control panel 606 (e.g., a user interface), wherein the electrical interface includes a first port 608*i* that is configured to receive the aforementioned power cable (or other such media), which is identified by the reference character 610, and a second port 608*ii* that facilitates charging of the accessory 400.

The power cable 610 extends from the first port 608*i* between the body 402 of the accessory 400 and the image capture device 100 (and/or other devices) to facilitate bi-directional electrical communication therebetween including, for example, charging of the image capture device 100 by the power supply 414 (FIG. 5), wired control over functionality of the image capture device 100 via the control panel 606, etc. It is envisioned that the power cable 610 may connect to the image capture device 100 through the expansion module 372, as seen in FIG. 4A, or through the access port 115 in the door 114A, as seen in FIG. 4B. To facilitate compatibility of the accessory 400 with a wide range of devices, it is envisioned that the power cable 610 may include any suitable connector(s) 612 (e.g., a USB connector, a lightning connector, etc.).

Although illustrated as being fixedly connected to the body 402 (via the first port 608*i*) in the particular embodiment of the present disclosure seen in FIG. 4A, it is also envisioned that the power cable 610 may configured for removable connection to the accessory 400 (e.g., via the incorporation of corresponding male and female connectors on the power cable 610 and the body 402).

The second port 608*ii* is configured to receive an input cable (or other such media) (not shown) to support charging of the power supply 414 (FIG. 5) as well as charging of the image capture device 100 (or any other such device connected to the accessory 400). Although illustrated as being positioned vertically below the first port 608*i* in the particular embodiment of the present disclosure seen in FIG. 4A, it should be appreciated that the specific location of the second port 608*ii* may be varied without departing from the scope of the present disclosure. For example, it is envisioned that the second port 608*ii* may be positioned (laterally) adjacent to the first portion 608*i* (e.g., such that the port 608*i*, 608*ii* are in (general) axial alignment along the longitudinal axis X and are circumferentially offset from each other).

To provide a barrier to environmental elements and inhibit (if not entirely prevent) the entry of water and/or debris into the accessory 400 and/or the image capture device 100, it is envisioned that the ports 608*i*, 608*ii* and the connection between the power cable 610 and the image capture device 100 (and other devices) may be sealed (e.g., such that the accessory 400 and the image capture device 100 are water-resistant, splash-proof, etc.)

As can be appreciated through reference to FIGS. 4A-6, the electrical interface 604 is positioned on the forward surface 594*f* in (generally) diametric opposition to the second support 406 and the third support 408. More specifically, the electrical interface 604 and the second support 406 are positioned in (general) axial (vertical) alignment along the longitudinal axis X (FIG. 4A, 5) and are circumferentially offset from each other. Orientation of the electrical interface 604 on the forward surface 594*f* facilitates access to the power cable 610 and the second port 608*ii* when the accessory 400 in used with (e.g., is connected to) the ancillary product (accessory) AP (FIG. 5) in the wearable use case.

The control panel 606, by contrast, is located on the lateral surface 596*ii* in (general) axial (vertical) alignment with the second support 406 and the electrical interface 604 along the longitudinal axis X. More specifically, the control panel 606 is located vertically above the third support 408 and is (circumferentially) located between (offset from) the second support 406 and the electrical interface 604, which facilitates access to the control panel 606 across a wide variety of use cases as well as single-handed operation of the accessory 400 and, thus, the image capture device 100.

The control panel 606 facilitates and support various command and control features, which allows for operation of not only the accessory 400, but operation of the image capture device 100 via the accessory 400. The control panel 606 includes (a set, series, plurality of) buttons (switches) 614 and/or indicators 616, which may mirror corresponding buttons (switches) and/or indicators on the image capture device 100.

In the illustrated embodiment, the control panel 606 includes: a pairing button 614*i* (e.g., to establish wireless communication between the accessory 400 and the image capture device 100); a power button 614*ii* to selectively activate and deactivate the power supply 414 (FIG. 5), thereby controlling the communication of electrical energy to the image capture device 100 (or other such device(s) connected to the accessory 400) during charging; a mode button 614*iii* (which mirrors functionality of the mode button 110 (FIG. 1B) on the image capture device 100); a shutter button 614*iv* (which mirrors functionality of the mode button 112 (FIG. 1A) on the image capture device 100); and a light pipe 616*i* (e.g., an LED display or other such visual indicator), which provides information pertaining to charging status, the remaining capacity of the power supply 414, paired camera mode, paired camera shutter actuation, wireless pairing, etc. It should be appreciated, however, that the number of buttons 614 and/or indicators 616 may be increased or decreased in alternate embodiments to provide greater or lesser control over operability of the accessory 400 and/or the image capture 100 without departing from the scope of the present disclosure. To increase user feel, in certain embodiments, such as that illustrated throughout the figures, it is envisioned that one or more of the buttons 614 may include provide a tactile response (or other such feedback) to indicate activation.

The accessory 400 includes (a set, series, plurality of) internal electrical components (e.g., processors, circuitry, memory, etc.) that underpin the functionality of the accessory 400 as well as the various command and control features thereof to support both wired and wireless control of the image capture device 100. For example, it is envisioned that the accessory 400 may be configured for wireless communication with the image capture device 100 (e.g., via a Bluetooth connection), whether physically connected to the image capture device 100 (e.g., via the power cable 610) or disconnected therefrom. Wireless communication between the image capture device 100 and the accessory 400 allows for a more robust user experience by enabling hands-free operation of the image capture device 100 such as, for example, when the third support 408 function as the freestanding base 602 (FIG. 19), when the image capture device 100 is concealed within a water/weather-proof housing that interferes with connection of the power cable 610, etc.

While the present disclosure has been described in connection with certain embodiments, it is to be understood that the present disclosure is not to be limited to the disclosed embodiments, but, on the contrary, is intended to cover various modifications and equivalent arrangements included within the scope of the appended claims, which scope is to be accorded the broadest interpretation so as to encompass all such modifications and equivalent structures as is permitted under the law.

Persons skilled in the art will understand that the various embodiments of the present disclosure and shown in the accompanying figures constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure to achieve any desired result and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the present disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms such as "comprises," "includes," and "having" should be understood to provide support for narrower terms such as "consisting of," "consisting essentially of," and "comprised substantially of." Accordingly, the scope of protection is not limited by the description set out above, but is defined by the claims that follow, and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," "horizontal," "vertical," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately" and "generally" should be understood to encompass variations on the order of 25%, or to allow for manufacturing tolerances and/or deviations in design.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. An accessory for an image capture device, the accessory comprising:
 a body defining a longitudinal axis;
 a first support located at an upper end of the body and configured for movement about a fixed reference axis extending in parallel relation to the longitudinal axis, the first support including first protrusions configured for engagement with the image capture device and extending in parallel relation to the longitudinal axis; and
 a second support located at a lower end of the body, the second support reconfigurable between a collapsed configuration, in which the second support defines a grip for the image capture device, and an expanded configuration, in which the second support defines a freestanding base such that the accessory and the image capture device are supportable on a surface, the second support including:
  a first leg radially movable in relation to the body;
  a second leg radially movable in relation to the body; and
  a third leg radially fixed in relation to the body, wherein the first leg, the second leg, and the third leg cooperate to define the grip when the second support is in the collapsed configuration and cooperate to define the freestanding base in the expanded configuration via contact with the surface.

2. The accessory of claim 1, wherein the first leg and the second leg are spaced radially from the body when the second support is in the expanded configuration.

3. The accessory of claim 1, wherein the body and the first support define a gap therebetween allowing for axial movement of the first support in relation to the body between discrete positions.

4. The accessory of claim 1, wherein the first protrusions are configured for engagement with second protrusions extending from the image capture device.

5. The accessory of claim 4, wherein the first support includes:
 a first finger;
 a second finger spaced laterally from the first finger so as to define a first channel therebetween; and
 a third finger spaced laterally from the second finger so as to define a second channel therebetween.

6. The accessory of claim 5, wherein the second protrusions include:
 a fourth finger configured for insertion into the first channel; and
 a fifth finger configured for insertion into the second channel, the fifth finger spaced laterally from the fourth finger so as to define a third channel therebetween configured to receive the second finger.

7. An accessory for an image capture device, the accessory comprising:
 a body defining a longitudinal axis;
 a first support located at an upper end of the body, the first support including first protrusions extending longitudinally and configured for engagement with second protrusions extending longitudinally from the image capture device, wherein the first support is axially movable in relation to the body along the longitudinal axis; and
 an expandable second support located at a lower end of the body, the expandable second support including:
  a first leg pivotable in relation to the body and including a first configuration; and
  a second leg non-pivotable in relation to the body and including a second configuration different than the first configuration.

8. The accessory of claim 7, wherein the first support is movable between discrete positions.

9. The accessory of claim 7, wherein the body and the first support define a gap therebetween allowing for axial movement of the first support in relation to the body.

10. The accessory of claim 7, wherein the body includes an upper surface defining a recess configured to receive the first support.

11. The accessory of claim 10, wherein the first support includes a lower portion configured for reception by the recess in the upper surface of the body.

12. The accessory of claim 11, wherein the recess in the upper surface of the body and the lower portion of the first support define corresponding circular configurations.

13. The accessory of claim 11, wherein the lower portion of the first support defines a bottom surface including planar sections.

14. The accessory of claim 7, wherein the first support is axially movable along a fixed reference axis extending in parallel relation to the longitudinal axis.

15. A method of using an accessory with an image capture device, the method comprising:
 connecting a first support located at an upper end of a body of the accessory to the image capture device;
 moving the first support linearly in relation to the body; and
 reconfiguring a second support located at a lower end of the body between a collapsed configuration, in which the second support defines a grip for the image capture device, and an expanded configuration, in which the second support defines a freestanding base such that the accessory and the image capture device are supportable on a surface, wherein the second support includes:
  a first leg and a second leg each having a generally identical first configuration; and
  a third leg having a second configuration different than the first configuration, the first leg, the second leg, and the third leg cooperating to define the freestanding base in the expanded configuration via contact with the surface.

16. The method of claim 15, wherein moving the first support in relation to the body includes moving the first support within a gap defined between the body and the first support.

17. The method of claim 15, wherein moving the first support in relation to the body includes moving the first support about a reference axis extending in parallel relation to a longitudinal axis of the body.

18. The method of claim 17, wherein reconfiguring the second support includes:

pivoting the first leg in relation to the body about a first axis extending in transverse relation to the reference axis; and pivoting the second leg in relation to the body about second axis extending in transverse relation to both the reference axis and the first axis.

19. The method of claim 18, further comprising stabilizing the accessory on the surface by bracing the accessory using the third leg.

20. The method of claim 19, further comprising providing the grip for the image capture device by reconfiguring the second support into the collapsed configuration, the grip including the first leg, the second leg, and the third leg.

\* \* \* \* \*